United States Patent
Tulbert

(10) Patent No.: US 7,859,519 B2
(45) Date of Patent: *Dec. 28, 2010

(54) HUMAN-MACHINE INTERFACE

(76) Inventor: David J. Tulbert, 68 Wellington Street East, Aurora, Ontario (CA) L4G 1H8

( * ) Notice: Subject to any disclaimer, the term of this patent is extended or adjusted under 35 U.S.C. 154(b) by 0 days.

This patent is subject to a terminal disclaimer.

(21) Appl. No.: 09/562,987

(22) Filed: May 1, 2000

(65) Prior Publication Data

US 2003/0137494 A1    Jul. 24, 2003

(51) Int. Cl.
*G06F 3/041* (2006.01)
(52) U.S. Cl. ..................................... 345/173
(58) Field of Classification Search ................ 345/173, 345/174, 175, 176, 179, 180; 178/18.09, 178/19.11
See application file for complete search history.

(56) References Cited

U.S. PATENT DOCUMENTS

| | | | |
|---|---|---|---|
| 4,305,071 A | 12/1981 | Bell et al. | 340/712 |
| 4,340,300 A | 7/1982 | Ruell | 356/71 |
| 4,346,376 A | 8/1982 | Mallos | 340/712 |
| 4,561,017 A * | 12/1985 | Greene | 348/707 |
| 4,629,884 A | 12/1986 | Bergström | 250/227 |
| 4,710,760 A | 12/1987 | Kasday | 340/712 |
| 4,746,770 A | 5/1988 | McAvinney | 178/18 |
| 4,968,877 A | 11/1990 | McAvinney | 250/221 |
| 5,181,108 A * | 1/1993 | Greene | 348/61 |
| 5,230,025 A | 7/1993 | Fishbine et al. | 382/4 |
| 5,467,403 A | 11/1995 | Fishbine et al. | 382/116 |
| 5,483,261 A | 1/1996 | Yasutake | 345/173 |
| 5,764,223 A * | 6/1998 | Chang et al. | 250/221 |
| 5,854,450 A * | 12/1998 | Kent | 178/18.01 |
| 5,982,352 A * | 11/1999 | Pryor | 345/156 |
| 6,061,177 A * | 5/2000 | Fujimoto | 359/443 |

FOREIGN PATENT DOCUMENTS

EP    0554492    8/1993

(Continued)

OTHER PUBLICATIONS

E. Panttaja, "Touch Screens let your fingers provide a fast, simple entry into the computer," *Electronics* (Apr. 19, 1984).

(Continued)

*Primary Examiner*—Jimmy H Nguyen
(74) *Attorney, Agent, or Firm*—Finnegan, Henderson, Farabow, Garrett & Dunner LLP

(57) ABSTRACT

A human-machine interface includes a panel formed of energy transmissive material having a contact surface on which one or more contacts may simultaneously be made. An energy source directs energy to the panel. The panel transmits energy received from the energy source to the contact surface. At least one parameter of the energy transmitted by the panel is altered at regions where contacts are made with the contact surface. A detector is coupled to the panel and detects the at least one parameter of the energy generally over the area of the contact surface and outputs values corresponding thereto. A processor is in communication with the detector. The processor processes the output values to determine the locations of the contact regions on the contact surface and at least one other attributed associated with each of the contacts.

72 Claims, 26 Drawing Sheets

FOREIGN PATENT DOCUMENTS

| | | |
|---|---|---|
| FR | 2485804 | 12/1981 |
| JP | 8-87380 | 4/1996 |

OTHER PUBLICATIONS

S. Begej, "Fingertip-shaped optical Tactile Sensor for Robotic Applications," *IEEE* 1988 pp. 1752-1757.

S. Begej, "Planar and Finger-shaped Optical Sensors for Robotic Applications," *IEEE Journal of Robotics and Automation*, v.4, No. 5 (Oct. 1988) pp. 472-484.

H. Maekawa, et al., "A Finger-shaped Tactile Sensor Using an Optical Waveguide," *1993 International Conference on Systems, Man and Cybernetics* Conference Proceedings vol. 5, (Oct. 17-20, 1993) pp. 403-408.

J. Kissinger, et al., "Edge-Light: A New Approach to Studying the Microvascularization of the Skin," *Bulletin of Prosthetics Research* (Spring 1978) pp. 65-77.

A. Collins, et al., "A Prototype for an Image-based Tactile Sensor," *IEEE* (1987) pp. 1760-1765.

A. Nomura, et al., "Two-dimensional Tactile Sensor Using Optical Method," *IEEE Transactions on Components Hybrids and Manufacturing Technology*, vol. CHMT8, No. 2 (1985) pp. 264-268.

R. White, et al., "Tactile Array for Robotics Employing a Rubbery Skin and a Solid-State Optical Sensor," *IEEE* (1985) pp. 18-21.

R. Betts, et al., "Critical light reflection at a plastic/ glass interface and its application to foot pressure measurements," Journal of Medical Engineering and Technology, vol. 4, No. 3 (May 1980) pp. 136-142.

R. Betts et al., "A device for measuring plantar pressures under the sole of the foot," *Engineering in Medicine*, I Mech E, vol. 7, No. 4 (1978) pp. 223-228.

\* cited by examiner

46

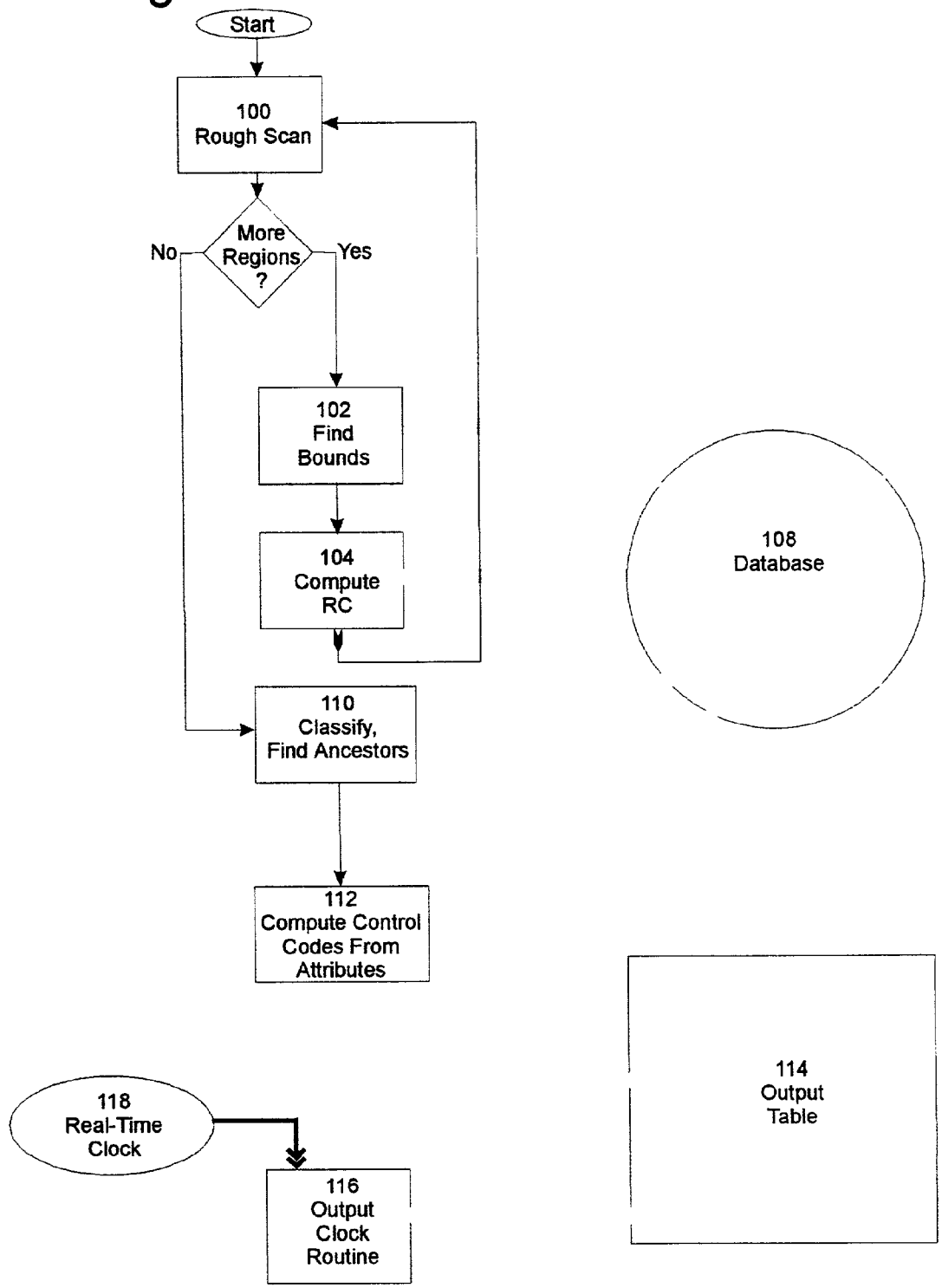

FIGURE 9. REGION OF CONTACT ("RC") DATA RECORD

| Bytes | Item |
|---|---|
| 0 - 1 | Root RC (oldest antecedant RC) record number |
| 2 - 3 | Parent RC (immediate antecedant RC) record number |
| 4 - 5 | Frame number ( 0 - 64K) |
| 6 - 7 | RC number ( 0 - 64K) |
| 8 | STATUS - High Byte |

Bit     Meaning when set
    7      Start RC
    6      RC growing
    5      Sent RC "On" control code
    4      End growth phase
    3      User activated pressure switch toggle
    2      RC area oscillating
    1      ( not used )
    0      ( not used )

| Bytes | Item |
|---|---|
| 9 | STATUS - Low Byte |

Bit     Meaning when set
    7      Start Decline of RC
    6      Declining RC
    5      Sent RC "off" control code
    4      Tracking Height
    3      Region lost and terminated
    2      ( not used)
    1      ( not used)
    0      DEAD RC

| Bytes | Item |
|---|---|
| 10 - 11 | Centroid X value |
| 12 - 13 | Centroid Y value |
| 14 - 15 | Finger tip X value |
| 16 - 17 | Finger tip Y value |
| 18 - 21 | Sum of all pixels in RC |
| 22 - 23 | Count of all pixels in RC |
| 24 | Channel assigned to RC ( for multi channel machine control) |
| 25 - 26 | Left upper corner X |
| 27 - 28 | Left upper corner Y |
| 29 - 30 | Right upper corner X |
| 31 - 32 | Right upper corner Y |
| 33 - 34 | Left lower corner X |
| 35 - 36 | Left lower corner Y |
| 37 - 38 | Right lower corner X |
| 39 - 40 | Right lower corner Y |
| 41 - 42 | Output Event code assigned for this RC |
| 43 - 44 | Width of finger outline at moment of contact |
| 45 | Strike velocity |
| 46 - 60 | Reference values from root RC: centroid X, Y; tip X, Y; pixel sum |
| 61 - 76 | Reference values from root: coordinates of corners of RC |
| 77 - 93 | Reference values from parent: coordinates of corners of RC |
| 94 - 285 | Histogram data ( 32 entries of 6 bytes) |

Byte     Value
    0 - 1    Number of pixels in this bin
    2 - 5    Sum of pixels in this bin

RC_ON

FAST_RC_ON

DEAD_RC

FAST_RC_OFF

RC_FAST_TAP

GROWING_RC

END_RC_ON

RC_OFF

RC_DECLINING

RC_OSCILLATING (upward)

RC_OSCILLATING(downward)

Figure 12a.
SWITCH_RC
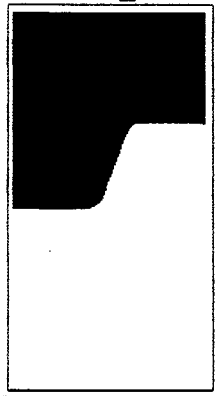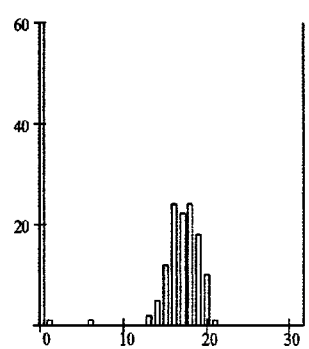
Figure 12b.
SWITCH2_RC
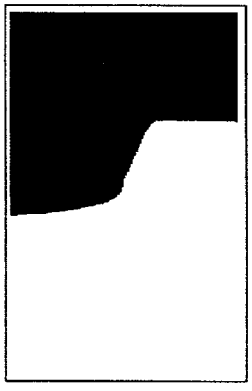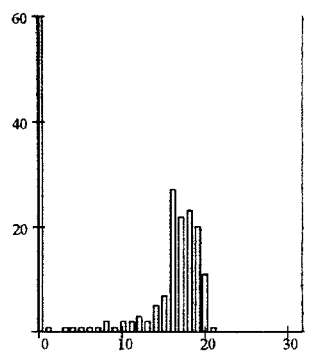
Figure 12c.
SWITCH3_RC
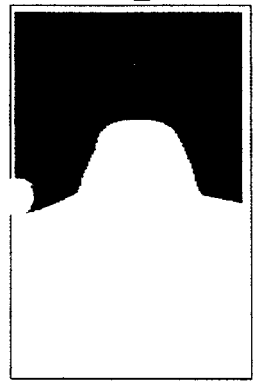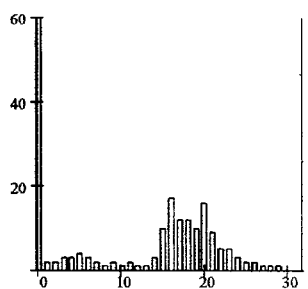

Figure 24.
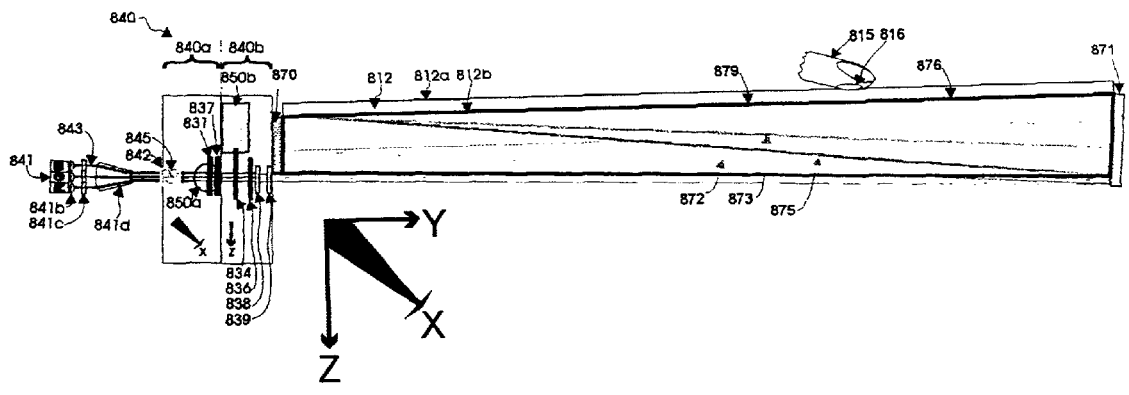
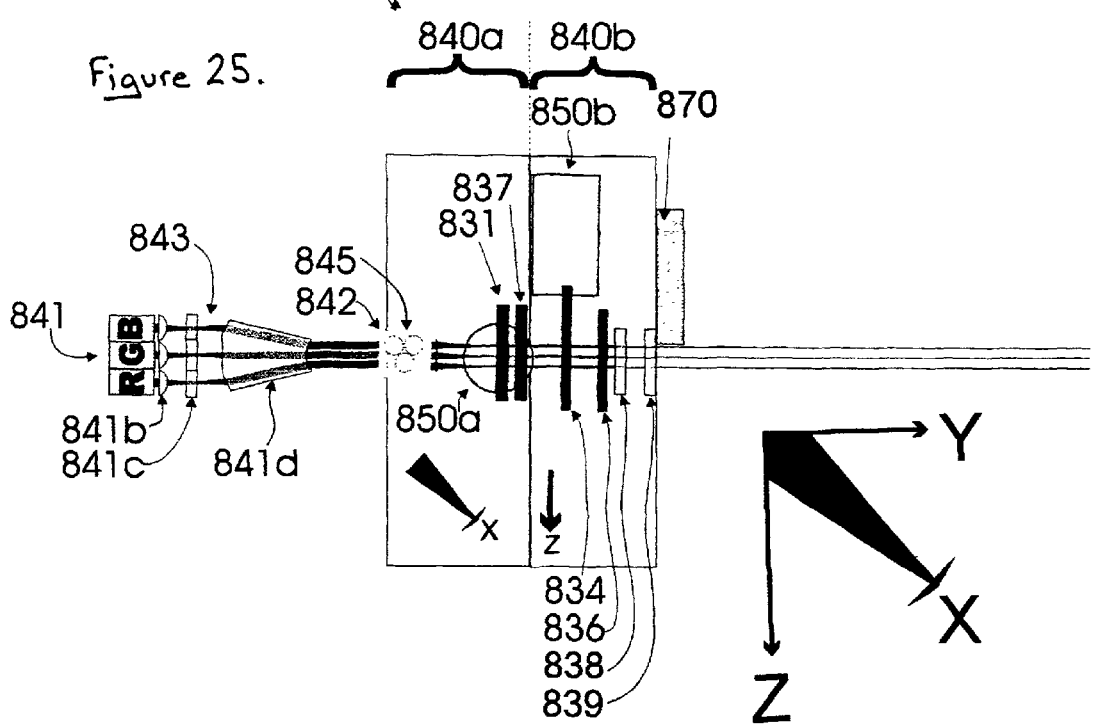
Figure 25.

HUMAN-MACHINE INTERFACE

FIELD OF THE INVENTION

The present invention relates generally to input devices and in particular to a human-machine interface and method for detecting contact between a surface and an object.

BACKGROUND OF THE INVENTION

Input devices such as mice and joysticks to facilitate user input to a computer executing program code are well known in the art. A user manipulating an input device of this nature is able to interact with the software application being executed by the computer. Although these input devices are common, touch sensitive panels have also been considered to enable users to interact with software applications being executed by computers.

For example, U.S. Pat. No. 5,483,261 to Yasutake discloses an interactive graphics system including a touch-sensitive controller having a plurality of semi-transparent, light-diffusing panels imaged by a rear mounted video camera. The video camera is arranged to detect shadows on the panels caused by objects, such as fingers, in proximity to panels. The video camera output is conveyed to a computer having a monitor displaying a user controllable object. The program code executed by the computer processes the video camera output and updates the display to move the user controllable object in accordance with movement of shadows on the panels.

European Patent Application No. 0 554 492 to International Business Machines discloses an input device for optical input of commands or data to a computer. The input device includes a virtual keyboard within the field of view of a camera. Images captured by the camera are analyzed and interpreted to detect hand movements over keys of the virtual keyboard. Corresponding data input signals are generated by the input device and conveyed to the computer for processing.

U.S. Pat. No. 4,346,376 to Mallos discloses a touch position sensitive panel to overlie a cathode ray tube (CRT) and receive radiated light therefrom. The edges of the touch position sensitive panel are fitted with photodetectors to detect light trapped in the panel. When a user contacts the panel surface, light from the CRT becomes trapped within the panel by total internal reflection and is detected by the photodetectors. The output of the photodetectors is compared with the CRT raster position to determine the position on the surface at which contact is made.

U.S. Pat. No. 4,629,884 to Bergstrom discloses a touch sensitive key including a radiation-propagating prism disposed between a radiation source and a radiation detector. When a user contacts the top surface of the prism, radiation from the source that enters the prism is scattered towards a side surface of the prism and is detected by the radiation detector.

U.S. Pat. No. 4,710,760 to Kasday discloses a photoelastic touch-sensitive screen having light reflecting edges and light emitting/receiving modules at two corners of the screen. Light focused into the screen by the modules, propagates by internal reflection, reflects off the edges of the screen and is returned to the modules for absorption by circular polarizers. The polarization of light changes when the upper surface of the screen is contacted. The degree of change in polarization is dependent on the force applied to the upper surface of the screen. The change in polarization is detected by the circular polarizers allowing the position and force of contact on the upper surface of the screen to be determined.

Although the above-mentioned references disclose touch sensitive panels to detect user contact and generate corresponding output signals, improved touch sensitive panels to enhance user input capabilities are desired. It is therefore an object of the present invention to provide a novel human-machine interface and method for detecting contact between a surface and an object.

SUMMARY OF THE INVENTION

According to one aspect of the present invention there is provided a human-machine interface comprising:
   a panel formed of energy transmissive material and having a contact surface on which one or more contacts may simultaneously be made;
   an energy source directing energy to said panel, said panel transmitting energy received from said energy source to said contact surface, at least one parameter of energy transmitted by said panel being altered at regions where contacts are made with said contact surface;
   a detector detecting the altered at least one parameter of said energy corresponding to contact regions on said contact surface and outputting values corresponding thereto; and
   a processor in communication with said detector, said processor processing said output values to determine the locations of said contact regions on said contact surface and at least one other attribute associated with each of said contacts.

In a preferred embodiment, the at least one other attribute includes the normal forces applied to the panel at each of the contact regions. The at least one other attribute further includes at least one of the shear forces applied to the panel at each of the contact regions, the instants contacts are made with the panel and the instants the contacts are ended, the duration of each of the contacts and oscillations in the normal forces applied to the panel during the contacts.

In a preferred embodiment, contacts are made on the contact surface of the panel with a user's fingers. Contacts between the panel and the fingers alters the direction of energy transmitted by the panel. In this case, the contact regions are generally elliptical in shape. A region above the panel is also illuminated to illuminate fingers or portions thereof proximal to but spaced from the contact surface. In this case, the at least one other attribute includes one or more of:
   the normal forces applied to the panel at each of the contact regions;
   shear forces applied to the panel at each of the contact regions;
   the instants contacts are made with the panel and the instants the contacts are ended;
   the velocities at which the contacts are made with the panel and the velocities at which the contacts are ended;
   the durations of the contacts; and
   oscillations in the normal forces of applied to the panel during the contacts.

The normal forces are calculated by determining the areas of the elliptical contact regions. The sheer forces are calculated by determining the coordinates of the displaced finger tips with respect to the centers of the contact regions.

According to another aspect of the present invention there is provided a method for detecting contacts on a panel having a contact surface and being formed of energy transmissive material comprising steps of:
   directing energy to the panel that is transmitted by the panel, at least one parameter of energy transmitted by the panel being altered at regions where contacts are made with the contact surface;

detecting the altered at least one parameter of said energy corresponding to contact regions on said contact surface and outputting values corresponding thereto; and processing the output values to determine the locations of the contact regions on the contact surface and at least one other attribute associated with each of the contacts.

According to yet another aspect of the present invention there is provided an interface for use with a panel formed of energy transmissive material and having a contact surface on which one or more contacts may simultaneously be made, the panel transmitting energy received from an energy source to the contact surface wherein at least one parameter of the energy transmitted by the panel is altered at regions where contacts are made with the contact surface, said interface comprising:

a detector detecting the altered at least one parameter of said energy corresponding to contact regions on said contact surface and outputting values corresponding thereto; and a processor in communication with said detector, said processor processing said output values to determine the locations of said contact regions on said contact surface and at least one other attribute associated with each of said contacts.

According to still yet another aspect of the present invention there is provided a display device to project an image comprising:

a panel formed of energy transmissive material and having a display surface on which said image is visible; and a scanner to direct a beam of light into said panel and scanning said beam across said display surface in a raster pattern to project said image, said scanner including a light source to generate said beam of light and a movable compound optical element disposed in the path of said beam, said compound optical element scanning said beam across said display surface in said raster pattern as said compound optical element moves.

In a preferred embodiment, the compound optical element includes at least two spaced, rotatable holographic optical elements (HOEs). Each HOE includes a ring of circumferentially spaced diffraction gratings. Each diffraction grating scans the beam across a respective row of the raster pattern when the beam impinges thereon and as the compound optical element rotates.

In one embodiment, the display further includes an array of diffraction gratings disposed on a surface of the panel opposite the display surface. Each row of diffraction gratings in the array is associated with a respective diffraction grating on the HOE and assists to focus the beam on the display surface during scanning of the beam.

The present invention provides advantages in that multiple simultaneous contacts with the panel contact surface can be detected with a high degree of precision. Also, the contact forces applied on the panel can be detected with a high degree of precision. As a result, a user is able to interact with the human-machine interface using complex and natural human gestures. This of course allows a user to interact better with virtually any machine to which the human-machine interface is connected. Furthermore, the present invention provides advantages in that the user need only apply low forces to the contact surface of the panel in order to generate corresponding output signals. This permits rapid user interaction with a high degree of tactility while reducing the risk of repetitive strain injuries (RSI). Furthermore, the present invention provides advantages in that the user manually interacts with the contact surface using the soft pulp tissue on the palmar surfaces of the finger tips. This tissue contains a higher density of fine touch receptors than any other external tissue of the body.

The present invention also provides advantages in that an image, such as that displayed on a computer video screen, may be displayed on the contact surface of the panel, permitting the user to interact directly with graphic objects such as menus, icons, images of virtual objects or data which require manipulation. The image may be updated or modified in real time as required to suit the needs of the user and/or machine to which the human-machine interface is connected. Since the image displayed on the contact surface and the user's hands remain in the user's field of view, the hand-eye mechanisms of the user's brain remain engaged, resulting in a significant increase in speed of manual target acquisition. In addition, the mechanisms of the user's brain responsible for manual target acquisition based upon the memory of the spatial location of the target, known to those skilled in the art as eidetic target acquisition, also remain engaged. Eidetic target acquisition permits a user of the present invention to touch a target no longer in the visual field due to a change of head and/or eye position, which has previously been seen.

BRIEF DESCRIPTION OF THE DRAWINGS

Embodiments of the present invention will now be described more fully with reference to the accompanying drawings in which:

FIG. 8 is a flow chart illustrating the steps performed by a processor forming part of the human-machine interface to detect regions of contact between a finger and the touch sensitive panel;

FIG. 9 shows data stored in memory within the processor during processing of an image acquired by the image acquisition device;

FIGS. 10a to 10e, 11a to 11f and 12a to 12c are graphs illustrating regions of contact between a finger and the touch sensitive panel and associated pixel intensity histograms for difference cases of contact during an image frame;

FIG. 13b is a representation showing the calculation of the distance a point on a hand is spaced above the touch sensitive panel forming part of the human-machine interface of FIG. 13a;

FIG. 17b is a representation of a portion of the touch sensitive panel forming part of the human-machine interface of FIG. 17a;

FIG. 22b is a side elevational view of the human-machine interface of FIG. 22a;

FIGS. 22c and 22d are side elevational views of folding mirrors forming part of the human-machine interface of FIG. 22a;

FIGS. 22e and 22f are enlarged top and side elevational views of a portion of the human-machine interface of FIG. 22a;

FIG. 23 is a schematic circuit diagram of an actuator drive circuit forming part of the human-machine interface of FIG. 22a;

FIG. 24 is a side elevational view of yet another embodiment of a human-machine interface in accordance with the present invention similar to the human-machine interface of FIG. 22a; and FIG. 25 is an enlarged side elevational view of a portion of the human-machine interface of FIG. 24.

DETAILED DESCRIPTION OF THE PREFERRED EMBODIMENTS

Figure 1:
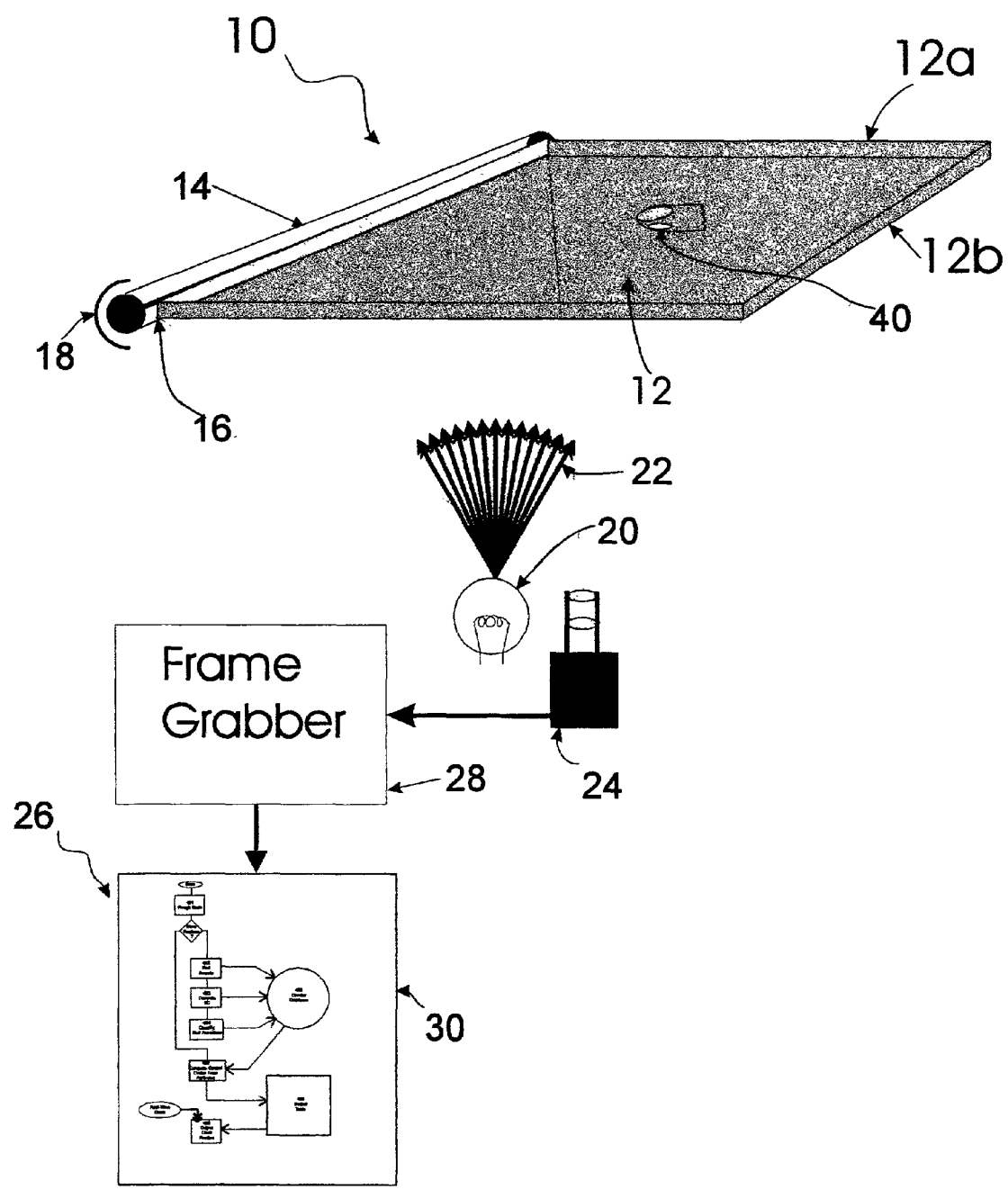
FIG. 1 is a schematic diagram, partially in perspective, of a first embodiment of a human-machine interface in accordance with the present invention.

Turning now to FIG. 1, a human-machine interface in accordance with the present invention is shown and is generally indicated to by reference numeral 10. As can be seen, human-machine interface 10 includes an energy transmissive panel 12 having an upper major contact surface 12a, and a lower major surface 12b generally parallel with the contact surface 12a. Panel 12 in this embodiment is formed of light conductive material such as for example glass. An elongate, incoherent light source 14 extends along one side edge 16 of the panel and radiates light energy into the panel 12. A semi-cylindrical mirror 18 surrounds the exposed side of the light source 14. Mirror 18 reflects light radiated from the light source 14 that is travelling in a direction away from the side edge 16 of the panel back into the side edge of the panel 12. Rays of light entering the panel 12 via the side edge 16 at angles greater than the critical angle of internal reflection of the panel, as measured with respect to an axis extending normal to the contact surface 12a, remain trapped within the panel 12.

Figure 2:
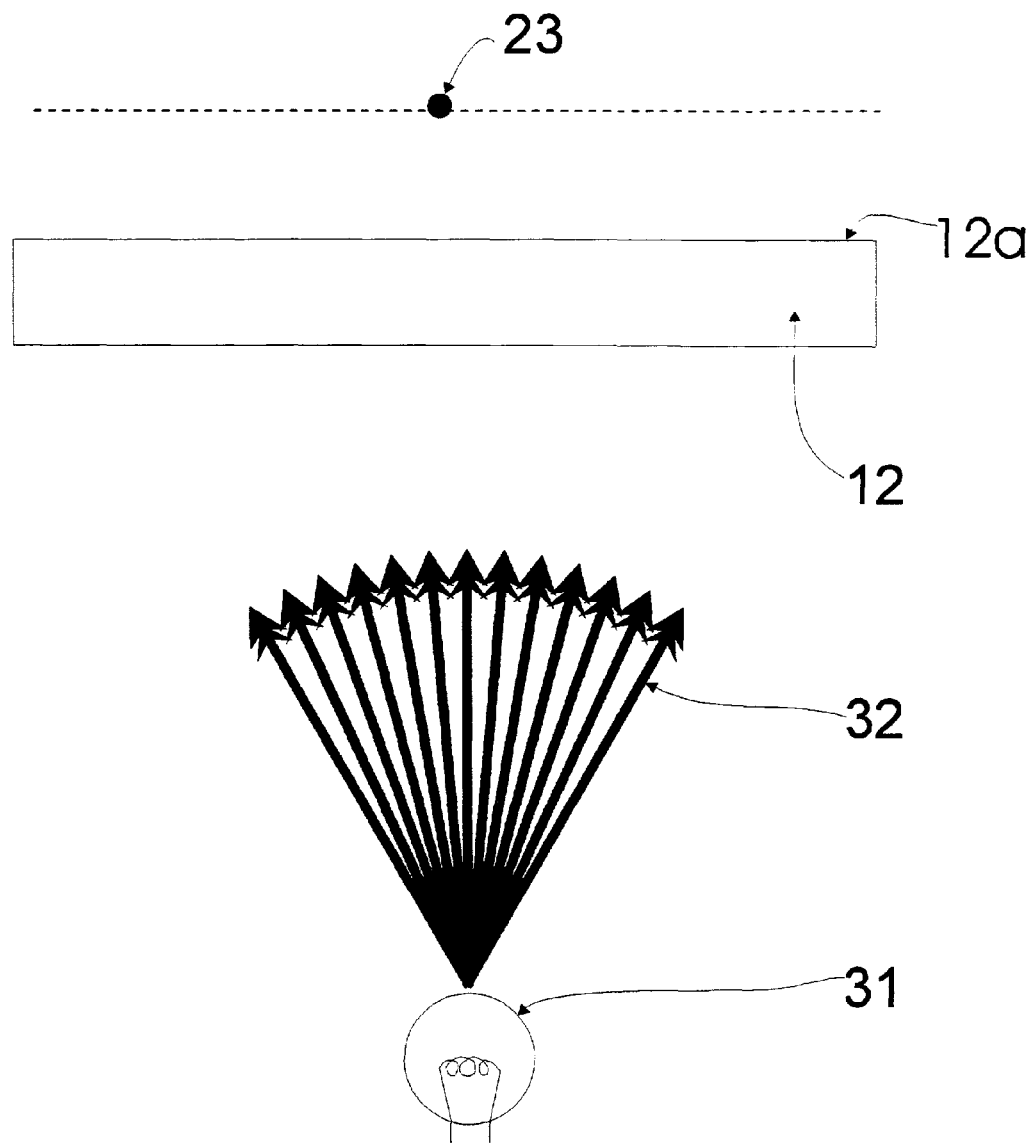
FIG. 2 is a schematic diagram of an enlarged portion of FIG. 1.

Disposed beneath the panel 12 is a secondary light source 20. Light source 20 emits radiating wavefronts 22 to illuminate the panel 12 and a region above it from beneath. The intensity of light radiated by light source 20 is selected with respect to the intensity of light radiated by the light source 14 so that objects or portions thereof 23 (see FIG. 2) that are spaced slightly above the contact surface 12a of the panel 12, such as portions of fingers not in actual contact with the contact surface 12a, are illuminated by the light source 20 but to a significantly lesser extent than portions of fingers in actual contact with the contact surface 12a that are illuminated by both the light source 14 and the light source 20.

An image acquisition device 24 in the form of a solid state CCD or CMOS area detector camera 24 is also disposed beneath the panel 12 to acquire images of the panel. Camera 24 is coupled to a digital frame grabber 28, which in turn is coupled to a processor 26 in the form of a personal computer. The frame grabber 28 captures and stores images, acquired by the camera 24, in digital memory therein. Personal computer 26 executes image analysis software 30 to analyze the acquired images and to generate output signals corresponding to user contact with the contact surface 12a of the panel 12. During the image analysis, a rough scan of each acquired image is performed to determine if the image includes one or more bright regions signifying user contact with the panel 12. If the image includes one or more bright regions, each bright region is then analyzed closely to determine the location of contacts on the contact surface 12a and the nature of the contacts ("contact attributes"). Further specifics of the human-machine interface 10 will now be described with reference to FIGS. 1 to 14.

The human-machine interface 10 allows multiple contacts with different regions of the contact surface 12a to be detected and processed virtually simultaneously. Since the human-machine interface 10 detects not only the locations on the contact surface 12a where contacts occur but also one or more contact attributes associated with the contacts, the human-machine interface can provide multiple output signals corresponding to each contact allowing it to be used to interface with processors performing high level functions.

When a finger 40 or other object contacts the contact surface 12a as shown in FIG. 1, the critical angle of internal reflection of the panel 12 at the contact region is raised. As a result, trapped light in the panel 12 escapes from the panel at the region of contact resulting in enhanced illumination at the region of contact, i.e. a bright region, corresponding in shape to the contact region. This occurs at each region where contact between an object, whose index of refraction is greater than that of air, and the contact surface 12a occurs. The intensity of light escaping at a contact region is not dependent on the pressure applied to the contact surface 12a by the object. However, if the object contacting the panel 12 is deformable, such as a finger, increased pressure applied to the contact surface 12a of the panel 12 results in a larger contact region between the object and the contact surface 12a. This in turn results in a larger bright region.

Figure 3A:
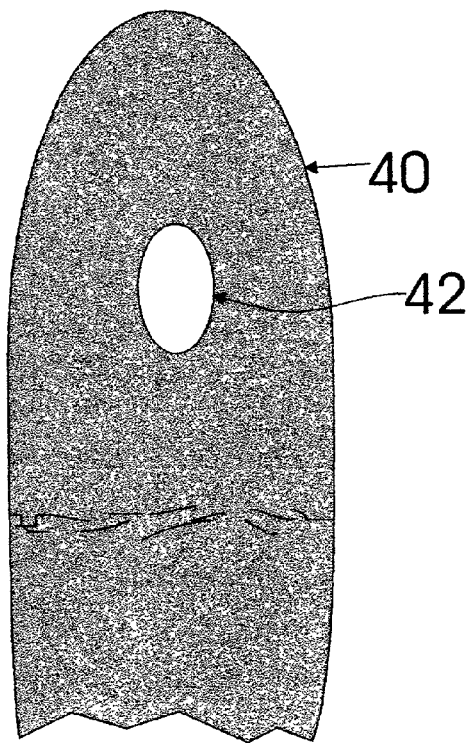
FIGS. 3a and 3b are illustrations showing fingers in contact with a touch sensitive panel forming part of the human-machine interface of FIG. 1.
Figure 3B:
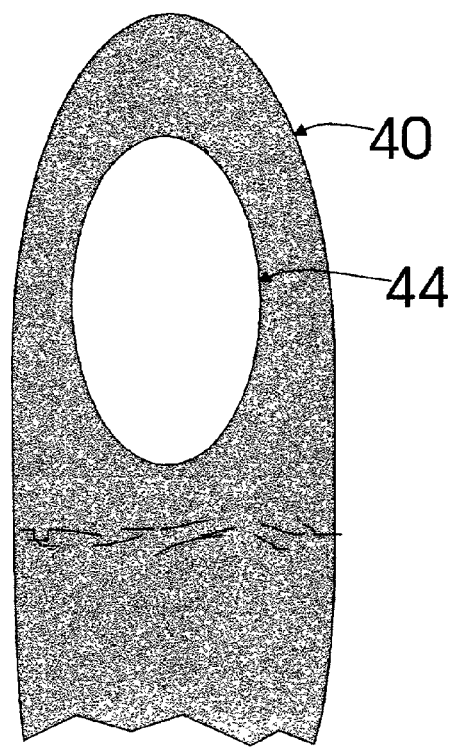

FIGS. 3a and 3b illustrate fingers in contact with the touch-sensitive panel as viewed from beneath the panel 12. As can be seen in FIG. 3a, when the finger 40 is brought into contact with the panel 12 and a small force is applied to the contact surface 12a, a small elliptical region 42 of the soft pulp tissue on the palmar surface of the finger tip is in actual contact with the contact surface 12a. When the force applied to the panel 12 by the finger 40 increases, the elliptical region 44 of the finger 40 in actual contact with the contact surface 12a increases as shown in FIG. 3b. As a result, the size of the elliptical region of the finger 40 in actual contact with the contact surface 12a provides an indication of the pressure applied to the panel 12 by the finger in a normal direction as a function of the elastic compliance of the finger 40. It will be appreciated that the intensity of illumination at any point within the contact region is the same and is not dependent on the applied pressure.

In addition to applied normal pressure, other contact attributes can be determined from the nature of contact between the finger 40 and the contact surface 12a of the panel 12. For example, shear forces applied to the contact surface 12a by the pulp tissue of the finger can be determined by measuring the translation of the geometric tip of the finger outline that is less brightly illuminated by the light source 20 with respect to the centroid of the elliptical contact region.

Figure 4A:
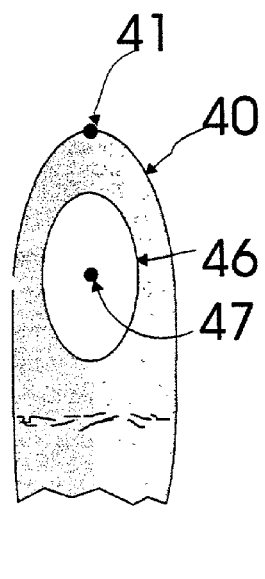
FIGS. 4a to 4c are additional illustrations showing fingers in contact with the touch sensitive panel.
Figure 4B:
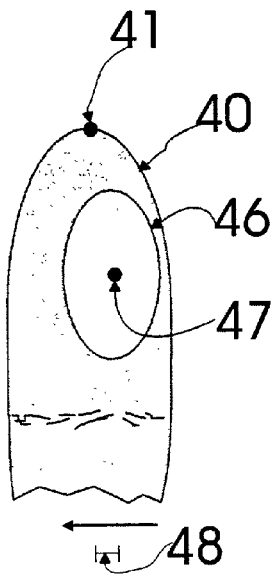
Figure 4C:
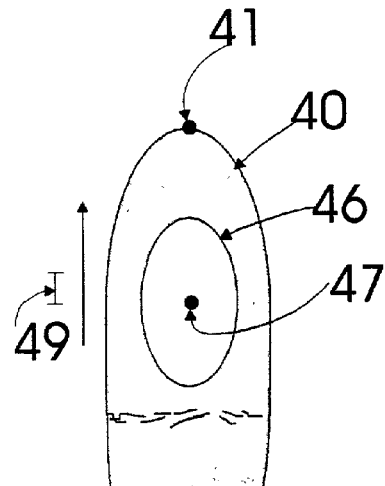

FIG. 4a shows a finger 40 having a geometric tip 41 in contact with the contact surface 12a. In this example, the direction of the force applied to the panel 12 by the finger 40 is normal to the plane of the contact surface 12a. As a result, the centroid 47 of the elliptical contact region 46 is centered on the pad of the finger 40 at a certain horizontal and vertical offset from the geometric tip 41 of the finger outline 40. FIG. 4b illustrates the situation where a shear force angled towards the left when viewed from below is applied to the contact surface 12a by the finger 40. In this case, the elliptical contact region 46 does not move due to friction. However, the bone and underlying tissues are dragged to the left when viewed from below. As a result, the geometrical tip 41 of the finger outline 40 is shifted to the left by an amount 48 with respect to the centroid 47 of the elliptical contact region 46. FIG. 4c illustrates the situation where a shear force angled towards the geometric tip 41 of the finger is applied to the contact surface 12a by the finger 40. As a result, the geometric tip 41 of the finger outline 40 is shifted away from the centroid 47 of the elliptical contact region 46 by an amount 49 when viewed from below.

The camera 24 includes an array of photodetectors configured to operate as integrating devices. Each photodetector is associated with a region of the panel 12 and generates output corresponding to a pixel of each image acquired by the camera 24. Each photodetector that is associated with a bright point in a bright region appearing on the panel 12, attains a certain pixel intensity value during each image frame. The contrast and sensitivity of the camera 24 are selected so that each photodetector attains the maximum pixel intensity value if the photodetector is exposed to a bright point in a bright region for the entire image frame, and a proportionally smaller pixel intensity value if the photodetector is exposed to a bright point for a proportionally smaller portion of the image frame. Histograms of the image pixel intensity values, which occur at the end of a given image frame, therefore provide historical data concerning changes in contacts with the panel 12 during an image frame. Examination of these histograms provides useful information, not otherwise readily available, about temporal changes in bright regions during an image frame.

Figure 5:
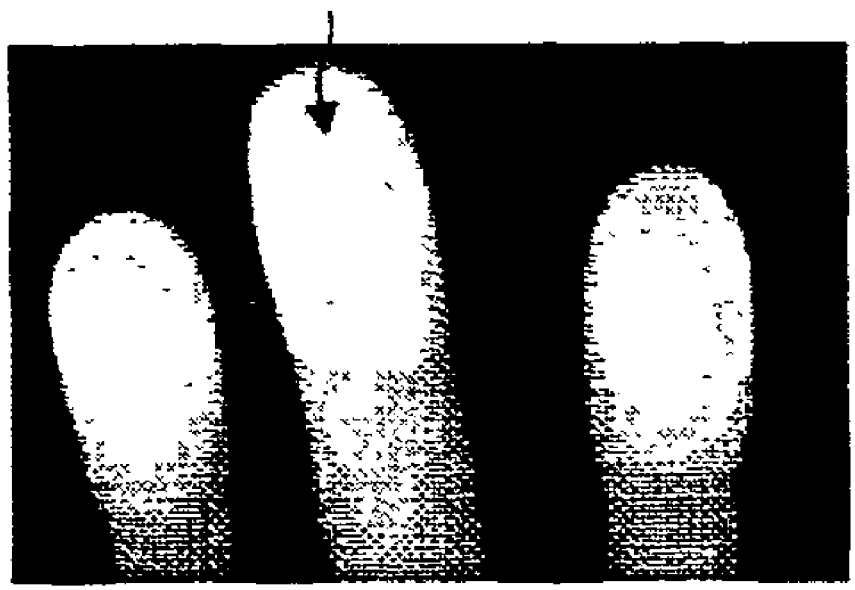
FIG. 5 illustrates images of fingers in contact with the touch sensitive panel captured by an image acquisition device forming part of the human-machine interface of FIG. 1.

FIG. 5 shows images acquired by the camera 24 of contact regions which do not change during an image frame. As can be seen, the pixel intensity values of image pixels associated with the elliptical contact regions 46 attain the maximum pixel value i.e. white. The pixel intensity values of image pixels associated with portions of fingers close to the actual contact regions 46 are significantly lower i.e. gray, while the pixel intensity values of image pixels associated with areas outside of the finger outlines are at the minimum value i.e. black.

FIGS. 6a and 6b and 7a and 7b are graphs illustrating the relationship between changes in the area of a bright region during an image frame (as a result of changes in the normal force applied to the contact surface 12a) and changes in the intensity values of the associated image pixels at the conclusion of the image frame. FIGS. 6c and 7c show histograms of the associated pixel intensity values.

Figure 6A:
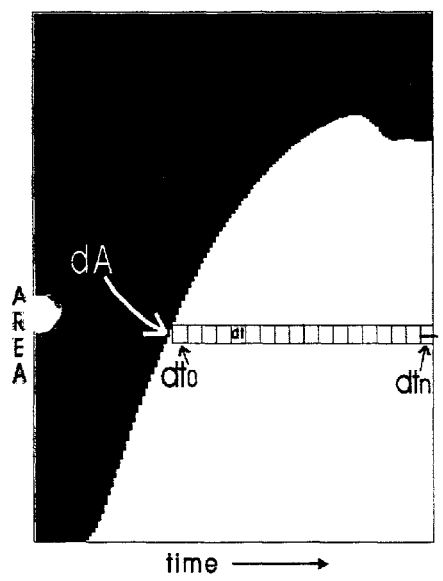
FIGS. 6a to 6c are graphs illustrating the relationship between changes in an area of enhanced illumination, resulting from a growing region of contact between a finger and the touch sensitive panel, and image pixel intensities during an image frame as well as an associated pixel intensity histogram.
Figure 6B:
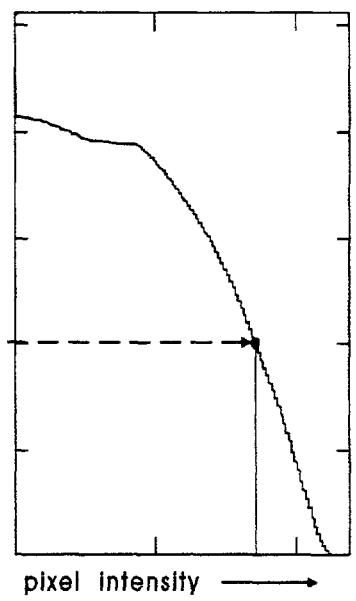
Figure 6C:
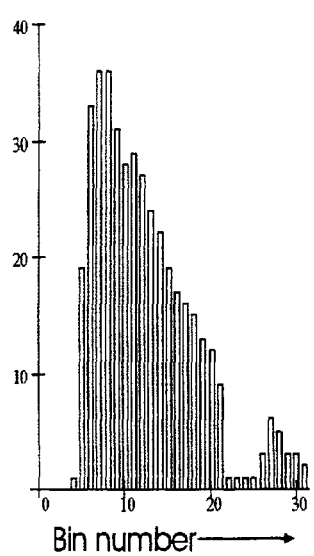

As can be seen in FIG. 6a, the graph shows the change in area of a growing (increasing) bright region over a single image frame i.e. the actual contact area between the finger 40 and the contact surface 12a increases during the image frame. FIG. 6b is a graph of the pixel intensity values of the image pixels associated with the bright region at the end of the image frame shown in FIG. 6a. The pixel intensity values are linearly related to the duration of the contact at the contact surface points corresponding to the image pixels. FIG. 6c is a histogram of the pixel intensity values of FIG. 6b sorted into 32 bins. The count in the bins is graphed on the vertical axis while the bin number is graphed on the horizontal axis from right to left. Bin 0 on the left contains a count of the image pixels within the image frame having the maximum pixel intensity value i.e. the image pixels were illuminated by a bright region for the entire duration of the image frame. Bin 31 contains a count of image pixels within the image frame that were illuminated for the least amount of time during the entire image frame. Bin 32 contains a count of image pixels within the image frame that were not illuminated at all during the image frame. Thus, the count in Bin 32 provides no useful information with respect to the discussion that follows, and therefore, has not been illustrated.

Figure 7A:
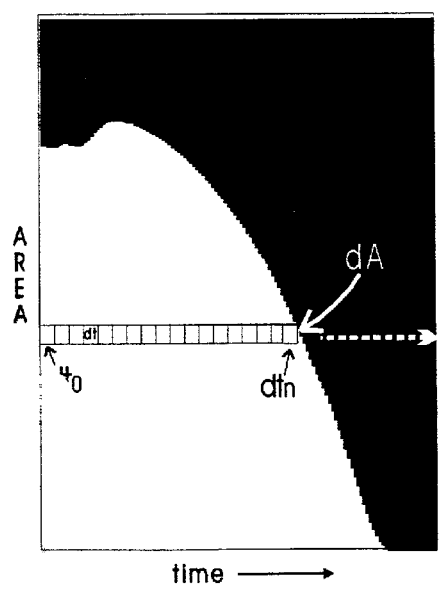
FIGS. 7a to 7c are graphs illustrating the relationship between changes in an area of enhanced illumination, resulting from a decreasing region of contact between a finger and the touch sensitive panel, and image pixel intensities during an image frame as well as an associated pixel intensity histogram.
Figure 7B:
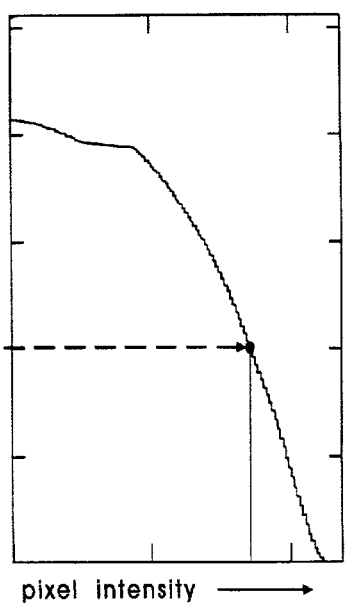
Figure 7C:
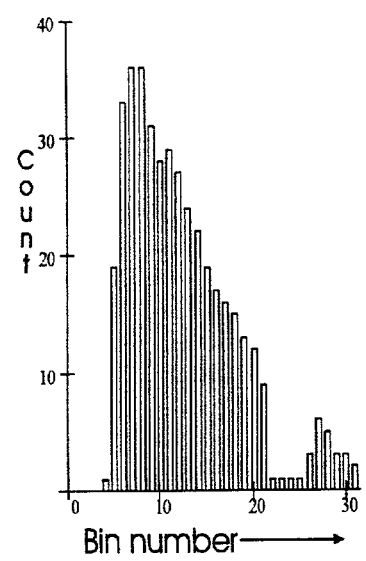
Figure 10A:
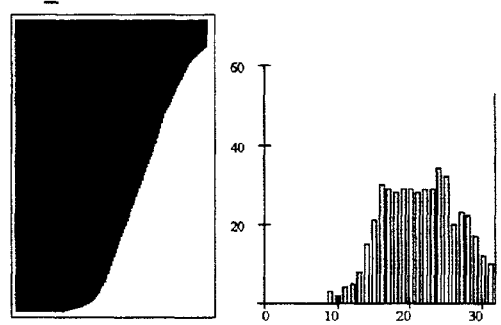
Figure 10B:
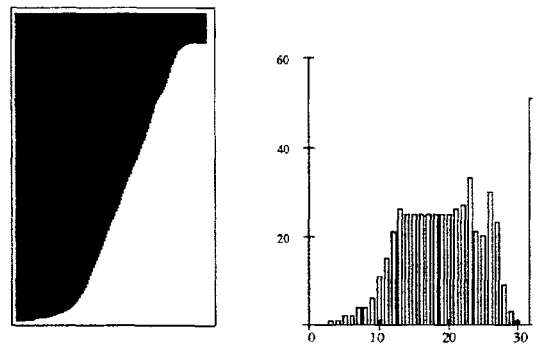
Figure 10C:
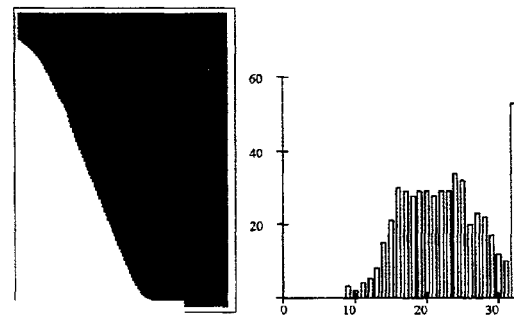
Figure 10D:
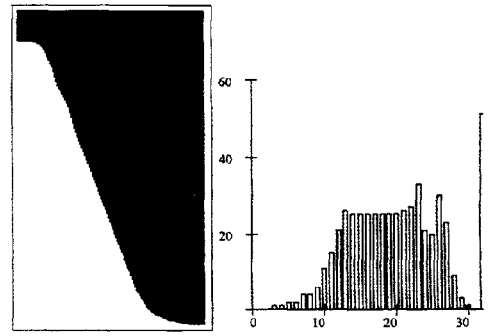
Figure 10E:
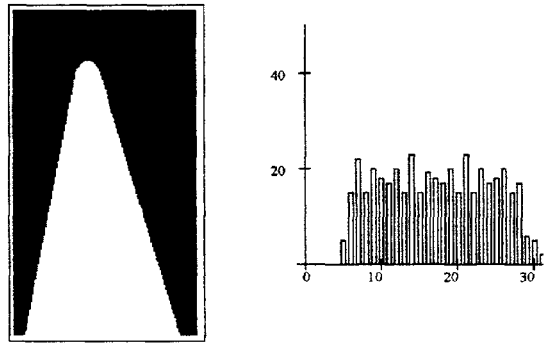
Figure 11A:
Figure 11B:
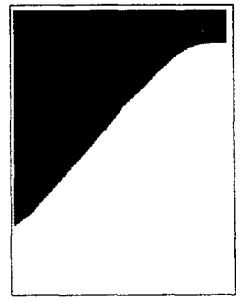
Figure 11C:
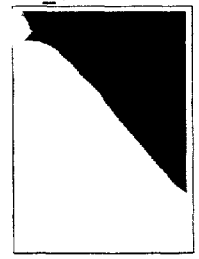
Figure 11D:
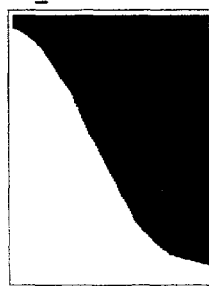
Figure 11E:
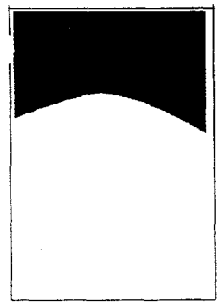
Figure 11F:
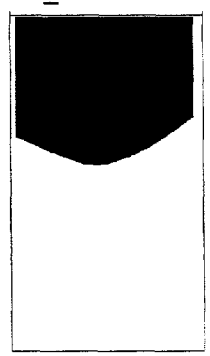

FIG. 7a is a graph showing the change in area of a decreasing bright region over a single image frame i.e. the actual contact area between the finger 40 and the contact surface 12a decreases during the image frame. FIG. 7b is a graph of the pixel intensity values of the image pixels associated with the bright region at the end of the image frame shown in FIG. 7a. FIG. 7c is a histogram of the pixel intensity values of FIG. 7b sorted into bins. As will be appreciated, the histograms shown in FIGS. 6c and 7c are identical. As a result, it is not possible to distinguish between growing bright regions and decreasing bright regions simply by examining the histograms. The histograms do however provide other information allowing bright regions to be sorted into categories. For example, histograms with bin 0 counts equal to zero represent either growing bright regions originating after the beginning of an image frame or decreasing bright regions ending prior to the end of an image frame.

During normal operation, the relative intensities of the light sources 14 and 20, the f-stop of the camera lens, the exposure time of the camera 24, and the contrast of the camera 24, are adjusted so that camera pixels associated with regions of a finger 40 not contacting the surface 12a will attain pixel values in the range of from about 4 to 127, camera pixels associated with regions of a finger 40 contacting the surface 12a will attain pixel values in the range of from about 128 to 255, and camera pixels not associated with regions of a finger 40 will attain pixel values in the range of from about 0 to 3. Once an image of the panel 12 has been acquired by the camera 24, the pixel intensity values attained by the photo-detectors that form the image are captured by the frame grabber 28 and are loaded into its digital memory. The pixel intensity values are then accessible to the personal computer 26 for analysis by the image analysis software 30 executed by the personal computer. FIG. 8 is a flow chart illustrating the logic of image analysis software 30.

Initially, the image analysis software 30 invokes a rough scan software subroutine 100 to locate image pixels having pixel intensity values greater than 127 by performing a comparison operation between image pixels and a preset pixel value threshold equal to 127. The rough scan subroutine 100 is designed for fast operation and uses self-modifying code to scan the panel image. To improve speed further, only a subset of panel image pixels on a sparsely populated grid are examined during this routine. As soon as an image pixel above the threshold is detected, the rough scan software subroutine 100 branches to a subroutine 102.

During execution, subroutine 102 determines the horizontal and vertical boundaries of the smallest rectangular region enclosing the bright region by examining image pixels in the neighborhood surrounding the bright pixel until the edges of the bright region have been located. Subroutine 102 then writes this boundary data to a database as will be described. Control then passes to a software subroutine 104, which examines the image pixels in the elliptical bright region and computes the area of the bright region, its centroid, its long axis, and the histogram of its pixel intensity values. Subroutine 104 also computes the long axis of the less brightly illuminated finger outline, the geometrical tip of the finger outline, and the breadth of the finger outline. These computed values are recorded in a region of contact ("RC") database 108 within the memory of the personal computer 26. FIG. 9 shows the record field format for the data recorded in the database 108 for each bright region in an image frame. For each bright region, the database 108 maintains records for each previous frame in which the bright region also occurred. The database 108 may be circular i.e. when the last available memory location allotted to the database has been used, the software 30 automatically begins to overwrite old data at the beginning of the allotted memory. In this case, the memory allotted for the circular database 108 is sufficiently large to ensure that over-written data is no longer useful. The memory may alternatively only store an appropriate subset of records. Although this slows operation, the amount of required memory is significantly reduced.

Once the data has been stored in the database 108 by the subroutine 104, the rough scan subroutine 100 is recommenced at the point at which it was interrupted so that the next bright region in the panel image can be detected. When the next bright region in the panel image is detected, subroutines 102 and 104 are executed and the same steps described above are re-performed. The above process is performed for each bright region detected in the panel image.

When no further bright regions in the panel image are detected, control passes to a subroutine 110. During execution, subroutine 110 compares the data recorded in the database 108 for each bright region in the current image frame with data recorded for all of the bright regions detected in the previous image frame to determine whether each current bright region is present at substantially the same location as one of the bright regions in the previous image frame. If so, the subroutine 110 presumes that the current bright region is a continuation in time of a bright region that was present in the previous image frame, and stores the record number of the bright region's antecedents in bytes 0-3 in the record for that bright region in the database 108. If a current bright region is not present at substantially the same location as one of the bright regions in the previous image frame, the subroutine 110 presumes the bright region is new, and sets bit 7 of status byte 8 of the bright region's record in the database 108. The subroutine 110 also examines status bit 4 in status byte 9 ("Tracking height") for all of the bright regions in the previous image frame, which are not present in the current image frame. If this bit is set, subroutine 110 then determines the width of the finger outline for that region in the current image frame for use in calculation of the finger height attribute as will be described below.

The subroutine 110 then classifies each bright region in the current image frame into one of fourteen possible cases. The fourteen possible cases are described below with reference to FIGS. 10a to 12c.

FIGS. 10a to 10e show five cases of growing or decreasing bright regions in an image frame together with their associated histograms of pixel intensity values. In each of these cases, the count in bin 0 of each histogram is equal to zero since no point in these regions is present for the entire image frame. These cases are referred to as RC_ON, FAST_RC_ON, DEAD_RC, FAST_RC_OFF and RC_FAST_TAP. The RC_ON case represents the condition where a new bright region occurs in the current image frame and is still in a strike phase by the end of the current image frame i.e. the area of the bright region is still increasing at the end of the current image frame as indicated by the characteristics of the histogram. The FAST_RC_ON case represents the condition where a new bright region occurs in the current image frame and attains a stabilized maximum area by the end of the current image frame as indicated by the characteristics of the histogram. The DEAD_RC case represents the condition where a bright region, which was either an RC_OFF case (see below) or an RC_DECLINING case (see below) in the previous image frame, has ended in the current image frame as indicated by the characteristics of the histogram. The FAST_RC_OFF case represents the condition where the area of a bright region, which was either an END_RC_ON case (see below), a FAST_RC_ON case, or an RC_OSCILLATING case (see below) in the previous image frame, has decreased from a stable value to zero during the current image frame as indicated by the characteristics of the histogram. The RC_FAST_TAP case represents the condition where a new bright region occurs in the current image frame but diminishes to zero by the end of the image frame as indicated by the characteristics of the histogram. As will be appreciated, in each of the above five cases, the growing or decreasing bright regions all originate or terminate in the current image frame.

FIGS. 11a to 11f show six different cases of growing or decreasing bright regions in an image frame together with their associated histograms of pixel intensity values. In each of these cases, the count in bin 0 of each histogram is greater than zero. These cases are referred to as GROWING_RC, END_RC_ON, RC_OFF, RC_DECLINING, RC_OSCILLATING (upward) and RC_OSCILLATING (downward). The GROWING_RC case represents the condition where the area of a bright region, which was either an RC_ON case or a GROWING_RC case in the previous image frame, continues to grow in the current image frame as indicated by the characteristics of the histogram. The END_RC_ON case represents the condition where the area of a bright region, which was either an RC_ON case or a GROWING_RC case in the previous image frame, stops growing in the current image frame as indicated by the characteristics of the histogram. The RC_OFF case represents the condition where the area of a bright region, which was either an END_RC_ON case, a FAST_RC_ON case, or an RC_OSCILLATING case in the previous image frame, decreases by an amount greater than a minimum threshold programmed into the image analysis software 30 as indicated by the characteristics of the histogram. If the decrease in area of the bright region is smaller than this minimum threshold, subroutine 110 presumes the oscillation in the normal force applied to the contact surface 12a causing the change in the bright region area represents purposeful pressure control user input, and not the start of a finger release. The RC_DECLINING case represents the condition where a bright region, which was either an RC_OFF case or an RC_DECLINING case in the previous image frame, continues to decrease in area without disappearing entirely within the image frame as indicated by the characteristics of the histogram. The RC_OSCILLATING cases represent conditions where the area of a bright region, which was either an END_RC_ON case, a FAST_RC_ON case, or an RC_OSCILLATING case in the previous image frame, has either increased or decreased by an amount less than the minimum threshold referred to above as indicated by the characteristics of the histogram. In the case where the area of the bright region decreases, in order to qualify as an RC_OSCILLATING case, the amount the bright region decreases must be less than the amount required to qualify as an RC_OFF case. As will be appreciated, in each of the above cases, the bright regions are all continuations of bright regions that originated in a previous image frame.

FIGS. 12a to 12c show three special cases of growing or declining bright regions in an image frame together with their associated histograms of pixel intensity values. In each of these cases, the count in bin 0 of each histogram is also greater than zero. These cases are referred to as SWITCH_RC, SWITCH2_RC and SWITCH3_RC. The SWITCH_RC case represents the condition where a bright region, which was either an END_RC_ON case, an RC_OFF case, an RC_DECLINING case, or an RC_OSCILLATING case in the previous image frame, undergoes a sudden transient increase in area in the current image frame as indicated by the characteristics of the histogram. The above three special cases produce slightly different histograms because of differing dynamics in the area increase for each case. However, the histograms for all three cases show a marked concavity just to the right of bin 0. The subroutine 110 interprets these growing or declining bright regions as switch depressions, analogous to the depression of buttons on a mouse or track-pad. As will be appreciated, in each of the above three special cases the bright regions are all continuations of bright regions that originated in a previous image frame.

As will be apparent, during normal operation, new bright regions evolve in a fixed sequence. Specifically, bright regions appear, grow, possibly oscillate, decay and then disappear. Subroutine 110 determines the current state of progression of this evolution for each bright area. This is accomplished by analyzing the histograms associated with bright regions in the current image frame with reference to the data in the status bytes 8 and 9 associated with the same bright regions in the previous image frame that are stored data in the database 108. In the event of a change in the evolutionary status of a bright region, the subroutine 110 modifies the status bytes 8 and 9 of the database records for the bright regions. At any point in time, only certain new phases of evolution are possible. Subroutine 110 therefore, generates an error condition if the evolutionary sequence does not occur as expected.

After classifying a bright region into one of the above fourteen cases by examining the histogram associated with the bright region and previous associated entries in the database 108, if they exist, subroutine 110 creates a "root" entry in the database 108 if the bright region is new, or creates a new "child" entry in the database 108 if the bright region was present substantially at the same place in the previous image frame.

When all of the bright regions in the image frame have been located and classified, the image analysis software 30 invokes a subroutine 112, which compares all of the classified bright regions with their antecedents, if any. For new bright regions, subroutine 112 computes contact attributes, which are used to generate corresponding output codes as will be described. For bright regions that existed in previous image frames, changes in contact attributes associated with the bright regions are computed and used to generate corresponding output codes. Specifically, for each bright region in the image frame, the subroutine 112 determines one or more of the following contact attributes as is appropriate for the state of evolution of the bright region and the requirements of the user:

the absolute X and Y coordinates of the centroid of each elliptical bright region;

the rotation of the finger by comparing the long axis of the finger outline with a reference line;

the normal force applied to the panel 12 by the finger by examining the area of the elliptical bright region taking into account elastic compliance relationships of finger tissues;

X and Y shear forces applied to the panel 12 by computing the X and Y displacement of the finger tip with respect to the centroid of the bright region, as compared to the displacement in the root entry of the database 108, and taking into account elastic compliance relationships;

angular rotational forces applied to the panel 12 by determining the angle subtended between the long axis of the elliptical bright region and the long axis of the finger outline;

the height above the contact surface 12a at which fingers of the hand no longer in contact with the contact surface 12a are located by comparing the current breadth of the finger outlines with the breadth of finger outlines when the fingers first make contact with the panel 12;

the instant of contact and release of the finger with the panel 12 by determining the image frame in which the bright region of contact first appears and then disappears, and then with greater precision by examining the histograms of the first and last frames of the bright region to determine the bin numbers in which the oldest pixel appears and the last pixel disappears;

the attack velocity and release velocity of the finger contacting and leaving the panel 12 by computing the slope of the histogram profiles, which are proportional to the rate of change of the areas of the bright region during attack and release intervals;

the duration of contact between the finger and the panel 12 by subtracting the release instant from the contact instant as determined above; and the presence of any switch region, as described above, by examining the contour of the histogram of the current bright region.

With respect to the determination of the contact and release instants, the temporal resolution is 1/M times the image frame time where M is the number of bins in the histogram. This resolution is limited by the accuracy of the intensity resolution of the camera 24.

Once the various contact attributes have been calculated for each bright region in the panel image, the subroutine 112 computes control codes corresponding to the contact attributes of interest, or changes in contact attributes of interest. The control codes are then inserted into a data table 114 queued for output. Each control code entry in the data table 114 takes the form of an attribute code-value pair. The data in the data table 114 can thus be quickly conveyed to other software executed by the personal computer 26 or other machines or processing devices to allow the user to interact therewith.

The output of the data table 114 is controlled by a clock interrupt routine 116 that is responsive to a real time clock 118. Clock interrupt routine 116 begins executing $T_{fr}+T_{mpr}$ seconds after the human-machine interface 10 begins operation, where $T_{fr}$ is the time required for the camera 24 to acquire an image frame and $T_{mpr}$ is the time required for the image analysis software 30 to process an image frame containing the maximum permitted number of bright regions. The clock interrupt routine 116 may be programmed to occur N times in each image frame, where N varies from 1 to any maximum which does not overload the processing capacity of the personal computer 26.

If the clock interrupt routine 116 occurs more that once per image frame (i.e. N>1), then the data table 114 is segmented into N pages. In this case, subroutine 112 inserts a series of interpolated control code entries in appropriate pages in the data table 114. For some of the contact attributes, subroutine 112 may analyze the histogram data associated with the current or previous image frames that is computed by subroutine 104 in order to compute temporal changes more accurate than those obtained through interpolation.

In one example of a machine control application, the human-machine interface 10 is used to control an electronic music synthesizer whose hardware may be located either inside the personal computer 26 or in a separate external chassis. Such synthesizers are capable of generating different musical sounds on sixteen or more simultaneous audio output channels. The user may specify the many attributes of each different sound by creating and loading a "patch program", which is typically different for each channel. The patch program sets some of the attributes of the sound to fixed values, but permits numerous other attributes to be controlled through external control signals in real time.

In prior art systems, the control signals are typically generated by a separate piano-like keyboard device called a "MIDI controller". The control signals are serial digital data specifying a channel within the synthesizer, a specific attribute to be controlled, and a control value. For example, the frequency of a note is usually controlled by sending a "note on" signal to the synthesizer, which specifies a synthesizer channel and a frequency. The user specifies both the channel and frequency of the note by depressing a specific white or black key. The MIDI controller may measure the stroke velocity of a key depression and transmit it along with frequency information. The user controls other attributes of the sound, such as volume and vibrato, by manipulating the setting of potentiometer knobs, wheels or sliders located on the front panel of the MIDI controller The most sophisticated MIDI controllers also generate control signals representing the normal forces applied to depressed keys.

Unfortunately, the MIDI controller is only able to generate a few control signals at a time, firstly because it contains a limited number of potentiometers, and secondly because keys and potentiometers do not permit optimal, high speed, dexterous interactions with the user's hands. In contrast, the synthesizer is able to control dynamically many more attributes of each channel's sound. Moreover, in order for the synthesizer to make realistic sounds, more of its attributes need to be controlled than the MIDI controller permits. As a result, electronic music sounds "flat" and lifeless compared to music made by musicians playing real instruments. A violin synthesizer program, for example, is capable of producing a very life-like violin sound, but the MIDI controller cannot control the program with anywhere near the degree of finesse that a good violinist can control his violin. Musicians wishing to produce realistic sounding orchestral music using a MIDI controller will typically use relatively short notes so that the listener does not have time to realize that they are synthetic.

Since the present human-machine interface 10 takes advantage of the impressive dexterity of the human hand, the present human-machine interface 10 allows a MIDI controller to be fabricated that can adequately control the many controllable attributes in synthesizer programs. Moreover, the relationship between regions of contact on the surface 12a of the panel 12 and the corresponding output control codes that are generated can be programmed in any desired fashion and changed virtually instantaneously. Thus, for example, for a violin synthesizer program, the contact surface 12a can be programmed to assume the same morphology as a real violin, or any other desirable morphology.

In this particular application, the MIDI serial control data protocol is implemented. The user can specify the mapping between the finger attributes and the MIDI control codes output by the image analysis software 30. In this case, the image analysis software 30 generates the MIDI control codes corresponding to those attributes and inserts the control codes in the output data table 114. The user can also control the number of times per image frame that the image analysis software 30 outputs a complete sequence of control codes.

In the above example, the present invention is used to control a specialized instrument (i.e. machine). However, it is also possible to use the present human-machine interface 10 to control more general types of devices. For example, if the human-machine interface is placed on top of a computer cathode ray tube (CRT) display, virtual objects, such as menus and icons or graphical displays may be controlled with the same convenience that would pertain if they were small real objects on a table top. In order to do this in a manner well adapted to the human body, the image analysis software 30 includes an additional software subroutine for recognizing human gestures normally used when manipulating small real objects. In addition, the image analysis software 30 may be programmed to recognize other specific gestures and assign control codes to them.

The present invention has other advantages when used to control a machine. The force required to actuate a "keystroke" is very small, thereby increasing the speed of manual interactions while reducing the incidence of repetitive strain injury, a serious health problem in industries. In addition, by placing both the targets for manual interaction and the user's hands directly in the user's field of view, the present invention makes full use of the human hand-eye coordination brain mechanisms. These sophisticated mechanisms have evolved over millions of years to permit human hands to operate with rapidity and agility on small real objects. In addition, the present invention maximizes tactile feedback from the body to the brain by utilizing the soft pulp tissue on the palmar surface of the finger tips, which tissue contains the highest density of touch receptors in the human body.

Figure 13A:
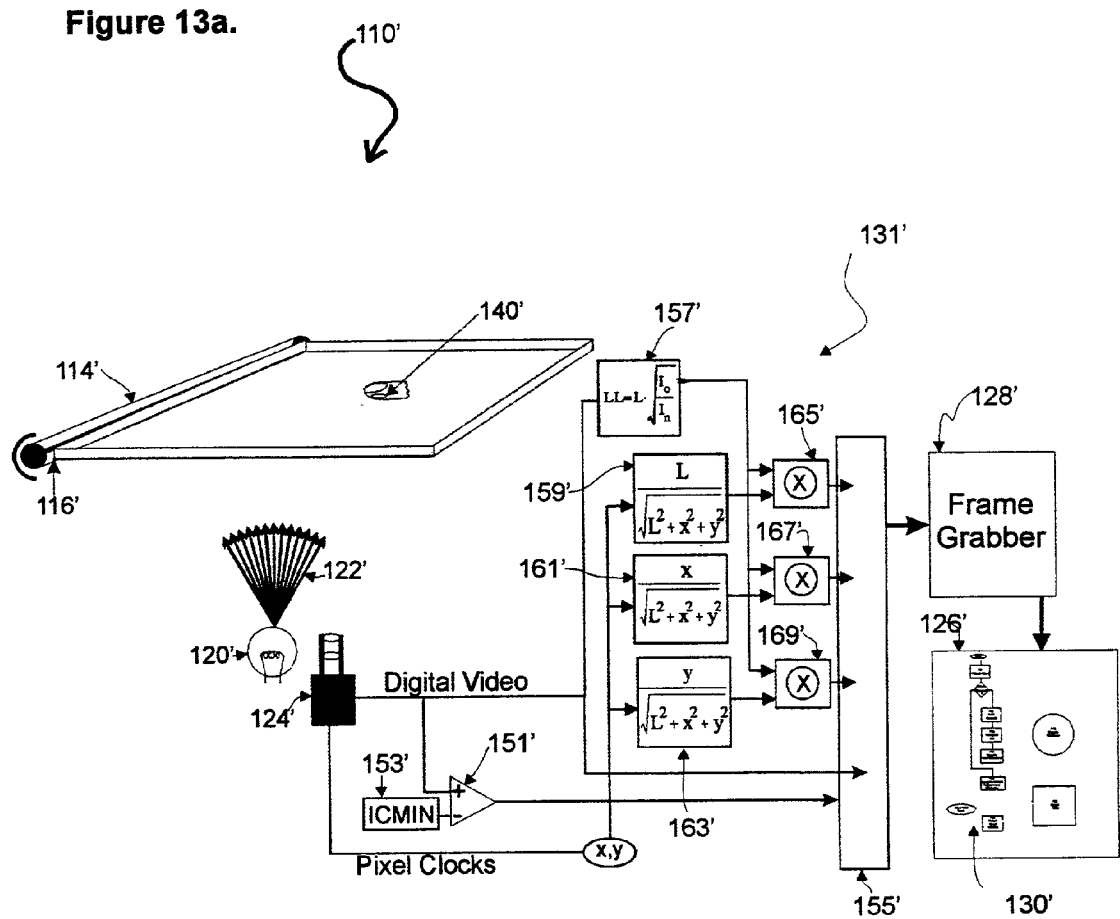
FIG. 13a is a schematic diagram, partially in perspective, of an alternative embodiment of a human-machine interface in accordance with the present invention.
Figure 13B:
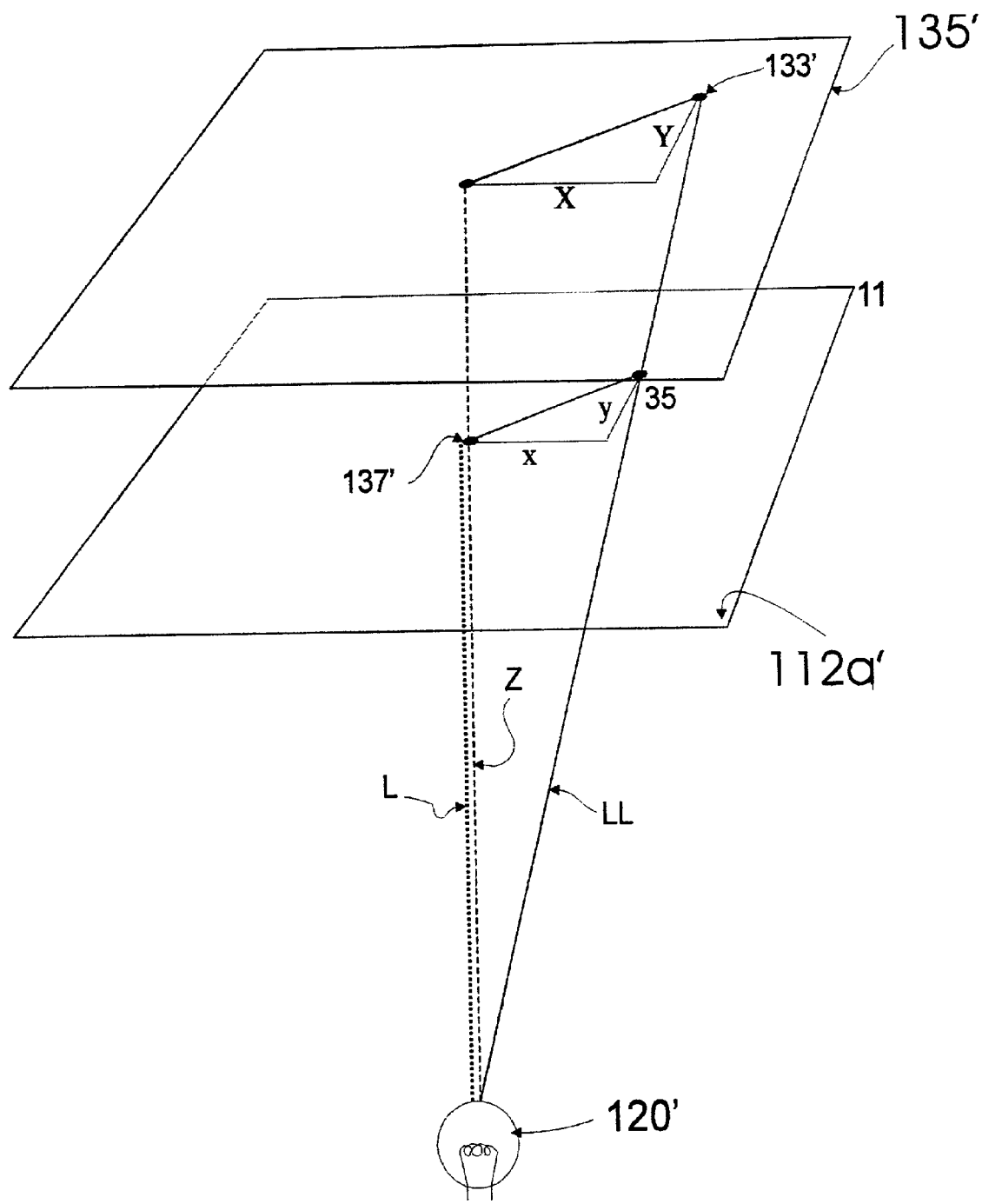

Turning now to FIGS. 13a and 13b, another embodiment of a human-machine interface in accordance with the present invention is shown and is generally indicated to by reference numeral 110'. As can be seen, the human-machine interface 110' includes a touch-sensitive panel 112' receiving light from a light source 114'. A point light source 120' and a camera 124' are disposed beneath the panel 112'. Processing circuitry 131' acts between the camera 124' and a frame grabber 128'. A personal computer 126' executing image analysis software 130' is coupled to the frame grabber 128'.

The processing circuitry 131' includes a comparator 151' receiving the output of the camera 124' as well as a constant $I_{CMIM}$ 153'. The output of comparator 151' is applied to a multiplexer 155'. Four look-up tables (LUTs) 157' to 163', which are loaded with values computed by the personal computer 126', are addressed by the video and clock outputs of the camera 124'. The outputs of the LUTs are applied to multipliers 165' to 169', which in turn provide output to multiplexer 155'.

The human-machine interface 110' operates in a similar manner to that of the previous embodiment except that in this case, the height at which points of fingers spaced above the contact surface 112a' of the panel 112' can be calculated. This calculation is made by using the inverse square relationship between the distance from a point source of light and the intensity of illumination. The pixel value intensities of image pixels associated with points on hands not in contact with the panel 112' vary by the inverse square of the distance from the light source 120'.

In order to calculate the distance a point on a finger is spaced from the contact surface 112a', as well as the general shape of a hand, it is convenient to use a Cartesian coordinate system. FIG. 13b shows a point 133' on a plane 135' spaced from the contact surface 112a' of panel 112'. The light source 120' is also shown positioned below the center 137' of the panel 112' by a distance L. The distance between the light source 120' and the point 133' is indicated by line LL. If the intensity at the center 137' of the contact surface 112a' is $I_o$, the inverse square law can be applied to yield the expression:

$$LL^2/L^2 = I_o/I_n \quad (1)$$

where $I_n$ is the intensity at any point on or above the contact surface 112a'. The line LL can then be expressed as:

$$LL = L \cdot \sqrt{\frac{Io}{In}} \quad (2)$$

Using the point source 120' as the center of the Cartesian coordinate system, coordinates can be expressed as follows:

$$Z = LL \cdot \cos\left(a\tan\left(\frac{\sqrt{x^2+y^2}}{L}\right)\right) = LL \cdot \left(\frac{L}{\sqrt{L^2+x^2+y^2}}\right) \quad (3)$$

$$X = LL \cdot \frac{x}{\sqrt{L^2+x^2+y}} \quad (4)$$

$$Y = LL \cdot \frac{y}{\sqrt{L^2+x^2+y^2}} \quad (5)$$

As will be appreciated, it is possible to compute a complete three-dimensional representation of the hand above the contact surface 112a', if these coordinate formulae are computed at video rates.

During operation of the human-machine interface 110, the video signal from the camera 124' is compared by digital comparator 151' to constant $I_{CMIN}$, which represents the minimum pixel intensity for a bright region. When the video signal is above $I_{CMIN}$, the comparator 151' signals the multiplexer 155'. In response, the multiplexer 155' conveys the raw digital video signal output of the camera 124' to the frame grabber 128' so that the image may be acquired and the bright regions in the image processed by image analysis software 130' in the manner previously described.

The raw digital video signal output of the camera 124' also controls the address lines of LUT 157', which holds the values for LL computed from $I_n$ using equation (2) above. The x and y pixel clock signals from the camera 124' control the address lines of LUTs 159', 161', and 163', which hold the values for the second terms of equations (3), (4), and (5) respectively. Multipliers 165', 167', and 169' produce the solutions to equations (3), (4), and (5) respectively, which are the Z, X and Y coordinates of the point, by multiplying the output of LUT 157' with those of LUTs 159', 161', and 163' respectively.

When the pixel value is below $I_{CMIN}$, the multiplexer 155' conveys the multiplier outputs to the personal computer 126' so that the frame grabber 128' can convey the computed Cartesian coordinate data to the image analysis software 130' for analysis.

In this case, the software subroutine 104 is modified to permit it to process the different data. The subroutine 104 uses the Cartesian coordinate data to locate the long axis and geometrical tip of the finger outline. The image analysis software 130' may optionally include a higher-level subroutine to discriminate the shape and position of the parts of the hand not in contact with the contact surface 112a' in relation to the point source 120' and derive control signals therefrom. The image analysis software 130' may also include a pattern recognition subroutine for discriminating manual gestures. Gesture recognition and related algorithms for determining the shape and position of the hand are well known to those skilled in the art.

If a more complex light source is used, such as an array of point sources, instead of light source 120', correction of the detected intensity $I_n$ for any pixel (x,y) on the contact surface 112a' is required. This is accomplished by multiplying the detected intensity In by a correction factor k(x,y) that is a function of the geometry of the complex light source. To accomplish the correction at video rates, it is preferable that the correction factors k(x,y) also be stored in LUTs.

Figure 14:
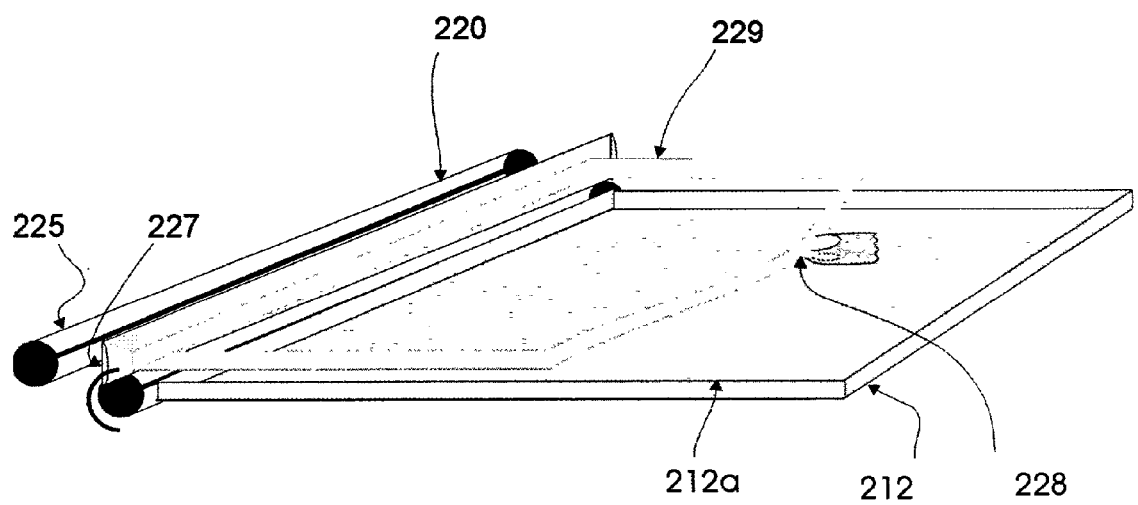
FIG. 14 is a schematic diagram, partially in perspective, of an alternative touch sensitive panel for a human-machine interface in accordance with the present invention.

Turning now to FIG. 14, another embodiment of a touch sensitive panel for a human-machine interface in accordance with the present invention is shown. In this embodiment, the secondary light source 20 is replaced with a secondary light source 220 disposed above the contact surface 212a of the panel 212. The light source 220 includes a linear filament lamp 225 and a cylindrical lens 227, and radiates a sheet of light 229 spaced above the contact surface 212a by approximately 0.25 inches. The sheet of light 229 radiated by the light source 220 is approximately 0.25 inches thick and is parallel to the contact surface 212a.

When fingers are brought into contact with the contact surface 212a, a lunate highlight 228 is produced on the finger tip by the sheet of light 229. The lunate highlight is captured in the panel images acquired by the camera (not shown). During processing of the image frames to calculate the contact attributes, the image analysis software in this embodiment, locates the tips of the lunate highlights rather than the geometrical tips of the finger outlines.

If it is only desired to determine the location of bright regions in panel images, and the normal force applied to the panel 12 at each contact region, the secondary light source can be omitted.

Figure 15:
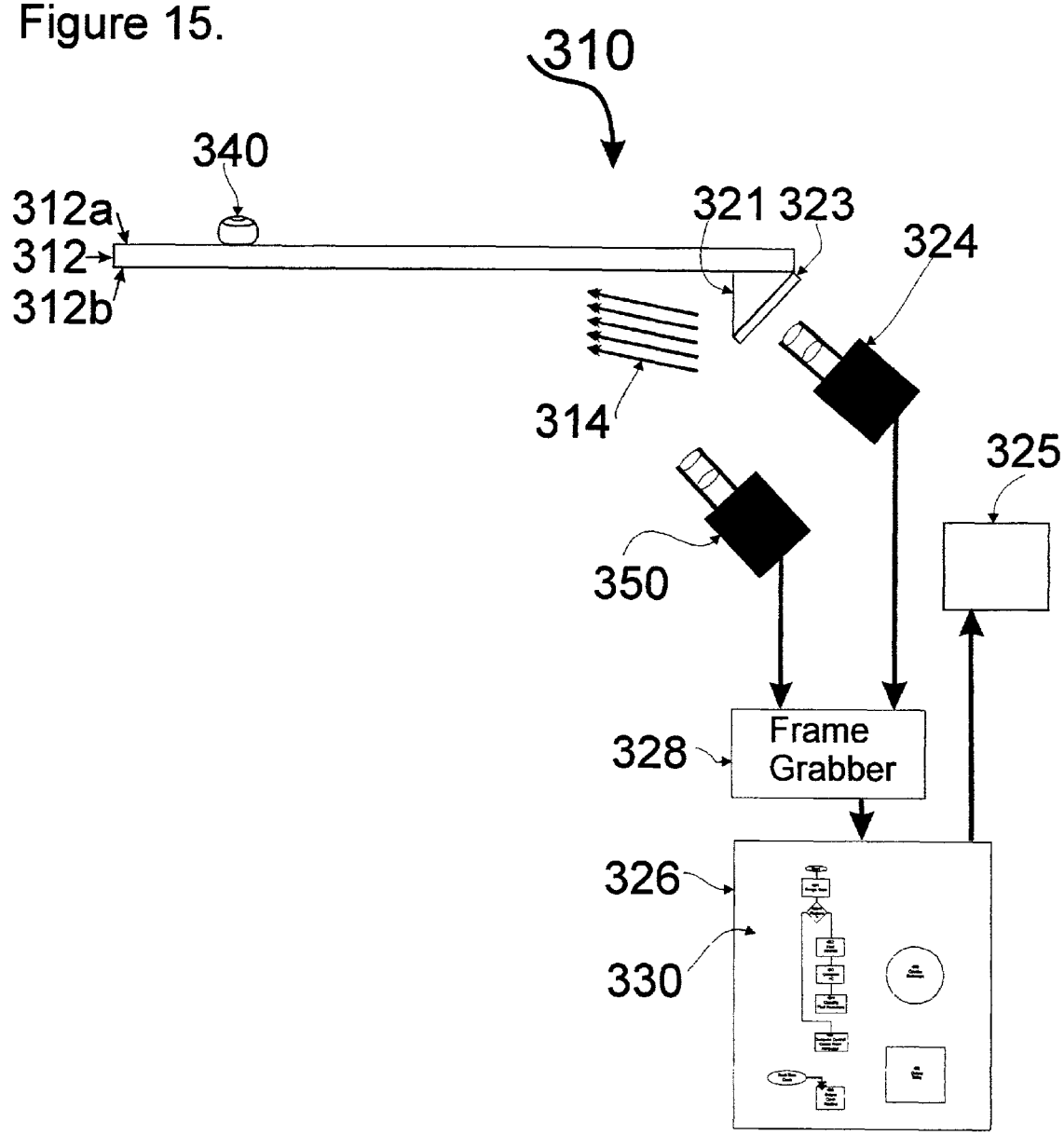
FIG. 15 a schematic diagram in side elevation of yet another alternative embodiment of a human-machine interface in accordance with the present invention.

Turning now to FIG. 15, yet another embodiment of a human-machine interface is shown and is generally identified by reference numeral 310. In this embodiment, the contact surface 312a and the bottom surface 312b of the panel 312 are parallel so that the panel acts as an internal reflection waveguide. A camera 324 is positioned to one side of the panel 312 and is aimed at a coupling prism 321 to permit the camera to register images internally reflected from the surfaces 312a and 312b. Directional radiation 314 from a light source (not shown), which points in the same direction as camera 324, strikes the bottom surface 312b of panel 312 at an acute angle and enters the panel 312 at an acute angle with respect to the contact surface 312a of the panel. Reflection of light 314 by artifactual grease spots on the contact surface 312a towards the camera 324 is reduced as a result of this camera and light source orientation. In addition, according to the laws of internal reflection, all extraneous environmental light entering the waveguide 312 through the contact surface 312a passes through the bottom surface 312b. Thus, extraneous environmental light is not internally reflected toward the camera 324 making the human-machine interface 310 insensitive to environmental light sources. A two-dimensional matrix shutter 323 is disposed on the exposed surface of the prism 321 to permit the selection of different angles of view into the waveguide 312.

In operation, directional light 314 is emitted by the light source towards the waveguide 312. Typically, the light 314 passes through waveguide 312. However, when an object such as a finger 340 is brought into contact with the contact surface 312a, light radiated by the light source is reflected by the finger back into the waveguide at all angles. Reflections whose angles are greater than the critical angle of internal reflection propagate through the waveguide 312 via multiple internal reflections to the prism 321. The matrix shutter 323 selects different angles of view for the camera 324. As a result, the camera acquires image frames of different propagation modes of the waveguide 312, as is described in U.S. Pat. No. 5,812,186. Digital logic 325 is programmed by the personal computer 326 to sequence rapidly the view angles of matrix shutter 323 thereby to produce a coherent scan of the entire contact surface 312a.

The images acquired by the camera 324 are captured by the frame grabber 328 and are analyzed by image analysis software 330 executed by the personal computer in a manner similar to that described previously. In this embodiment, the image analysis software, however, contains an additional subroutine (not shown) to remove modal artifacts introduced by the image capturing methodology.

If it is desired to image light reflected from regions of a hand not in contact with the waveguide 312, a second camera 350 may be positioned below the panel 312 as shown. Alternatively, a mirror-shutter system (not shown) may be used to enable the camera 324 to capture an image of the panel 312 from below.

If the surfaces 312a and 312b of the panel 312 are close together as well as parallel, then the panel will act as a self-imaging waveguide. Shono and Inuzuka ("Modally Allotted Transmission of Optical Images through Homogeneous Planar Waveguides", Japanese Journal of Applied Physics, 21, L135; 1982) have shown that through the self-imaging phenomenon such waveguides, even without a lens disposed between the object and an input prism to the waveguide, will image incoherent reflected monochromatic or color wavefronts to produce images at the output of the waveguide through the coupling prism 321, which can be imaged into the camera 324 using a standard camera lens. Images introduced into the waveguide by reflection by objects, such as fingers, in contact with the contact surface 312a, will be imaged by the same mechanism. If desired, the need for the matrix shutter 323 can be obviated by using a very thin panel 312 and an appropriate imaging system as taught by Shono and Inuzuka.

Figure 16:
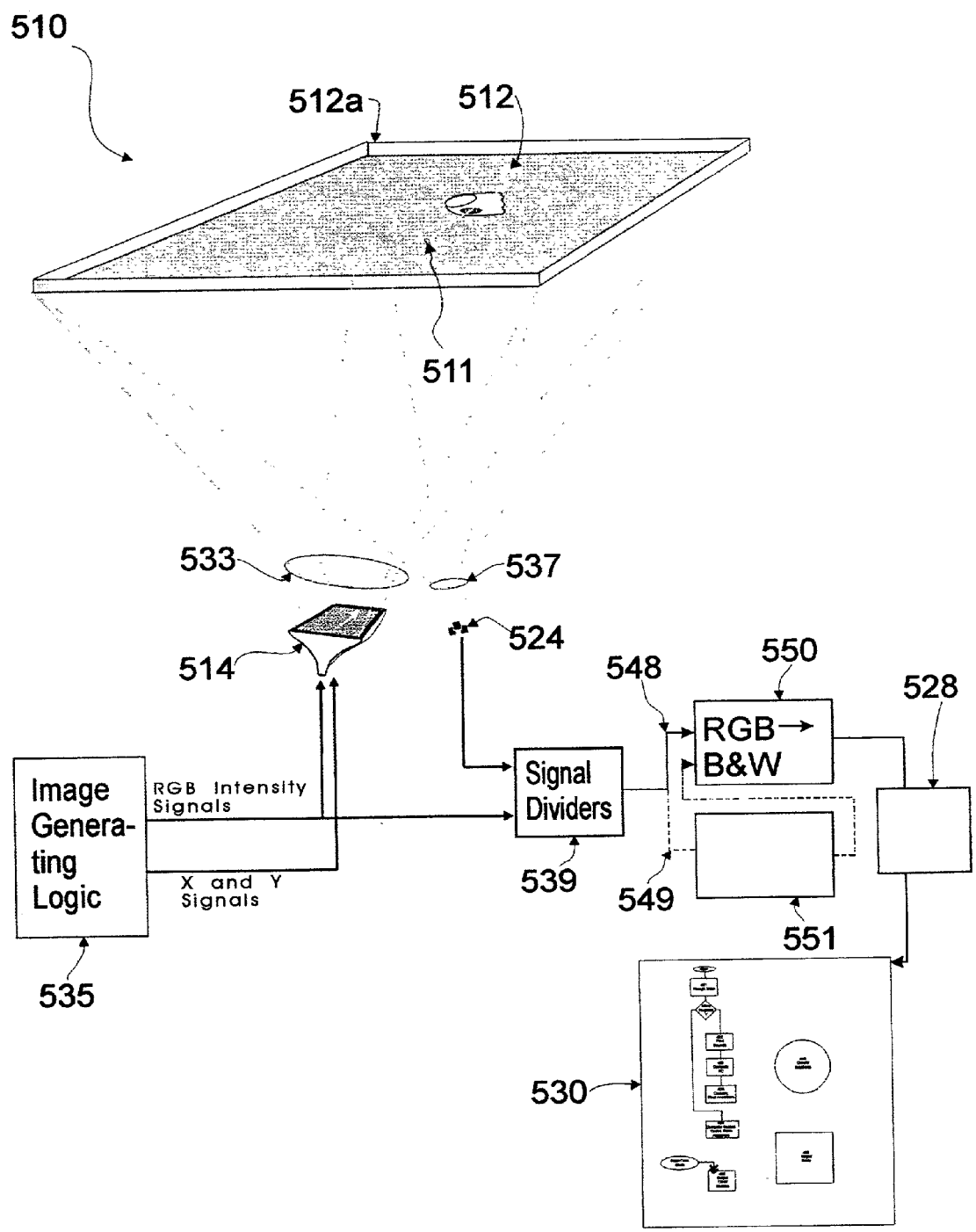
FIG. 16 is a schematic diagram, partially in perspective, of still yet another alternative embodiment of a human-machine interface in accordance with the present invention.

Turning now to FIG. 16, still yet another embodiment of a human-machine interface is shown and is generally indicated to by reference numeral 510. In this embodiment, a cathode ray tube (CRT) 514, whose phosphors decay very rapidly, is disposed below the panel 512. The CRT 514 displays an image in response to red, blue and green (RBG) intensity signals and X and Y scanning signals output by image generating logic 535. The image is described by a flying CRT spot 511 having a negligible decay trail. A small positive intensity offset is added to the RBG intensity signals so that the CRT spot 511 is never black. The image displayed by the CRT 514 is projected onto the panel 512 via a lens 533. The image projected onto the panel 512 is visible when looking at the contact surface 512a.

In this embodiment, the flying CRT spot 511 that describes the image projected onto the panel 512 is reflected at regions where contact is made with the panel surface 512a. Reflected rays which have an angle of incidence less than the critical angle of internal reflection pass through the bottom surface of the panel 512 and are gathered by a lens 537. Reflected rays with an angle of incidence greater than the critical angle of internal reflection propagate through internal reflections to the minor edges of the panel. The light gathered by the lens 537 is focused through red, green and blue filters (not shown) onto three photodiodes 524. The reflectivities for the RGB channels (i.e. the ratio of reflected light to incident light) are calculated in real-time by signal dividers 539, which divide the RGB photodiode output signals by the RGB intensity signals received from the image generating logic 535. Since the area behind the panel 512 is far away and generally non-reflective, the RGB reflectivities output by the signal dividers 539 are 0 (black) unless a user's fingers are in contact with or slightly above the contact surface 512a.

As is shown, the RGB signals output by the signal dividers 539 are passed to a circuit 550, which combines the RGB images together in correct proportions to produce a gray scale image. The gray scale image is then conveyed to the frame grabber 528 before being processed by the image analysis software 530. The gray-scale reflectivities corresponding to contact regions are similar to the pixel value intensities described in the previous embodiments and are therefore, readily recognizable by the image analysis software 530. Alternatively, the RGB signals can be routed to a VLSI video processor 551, which can chroma-key the RGB signals or change their contrast, pedestal and color balance to improve utility in certain ways. For example, human skin is more reflective in the red region, while oil marks on the contact surface 512a of the panel 512 are more reflective in the blue region. Chroma-keying in the red-orange region of the RGB signals can therefore help differentiate such marks. The RGB signals are then converted to a gray scale image by circuit 550. From circuit 550, the gray scale image is conveyed to frame grabber 528 before being processed by the image analysis software 530. If no color processing by video processor 551 is desired, the RGB photodiodes 537 can be replaced by a single photodiode producing a gray scale image directly. In this arrangement, two of the signal dividers 539 as well as circuit 550 can be eliminated. Rudimentary color processing can be provided by placing a color filter with the desired band-pass characteristics over the single photodiode.

The image projected onto the panel 512 may identify separate regions and/or present graphical objects to which specified control codes are assigned. In this manner, contacts made with the panel 512 at regions or on graphical objects visible on the contact surface 512a result in specified control codes being output by the human-machine interface 510.

Since a CRT is used in this embodiment to radiate light towards the panel 512, the accuracy of the reflectance measurements is degraded if the decay of the CRT phosphors is slow. In this case, the signal measured by the RGB photodiodes 524 at any instant may be written as:

$$V = \int_0^T I_t \cdot g(t) \cdot R_t dt \qquad (6)$$

where V is the instantaneous photodiode signal; t is time; $I_t$ is the original energy incident from a CRT spot at time t=0; $R_t$ is the percentage reflectance of the point on or above the surface receiving the energy; 0<g(t)<1 is the temporal decay function of the phosphor; and T is the number of previous spots on the CRT whose intensities have not decayed to some minimum value.

If the panel 512 is to be radiated by light from a typical commercial CRT 514 having slow phosphor decay, it is necessary to compensate for the slowness in phosphor decay. According to the equation (6) above, it is possible to calculate the contribution ($I_0 \times R_0$) to V made by the new CRT spot 511 at time t=0 by differentiating the signal V using an analog low-pass filter with appropriate roll-off characteristics. Since $I_0$ is known data input from the image generating logic 535, the reflectance of the point illuminated by the CRT spot can be computed in real time by simple division by $I_0$.

Figure 17A:
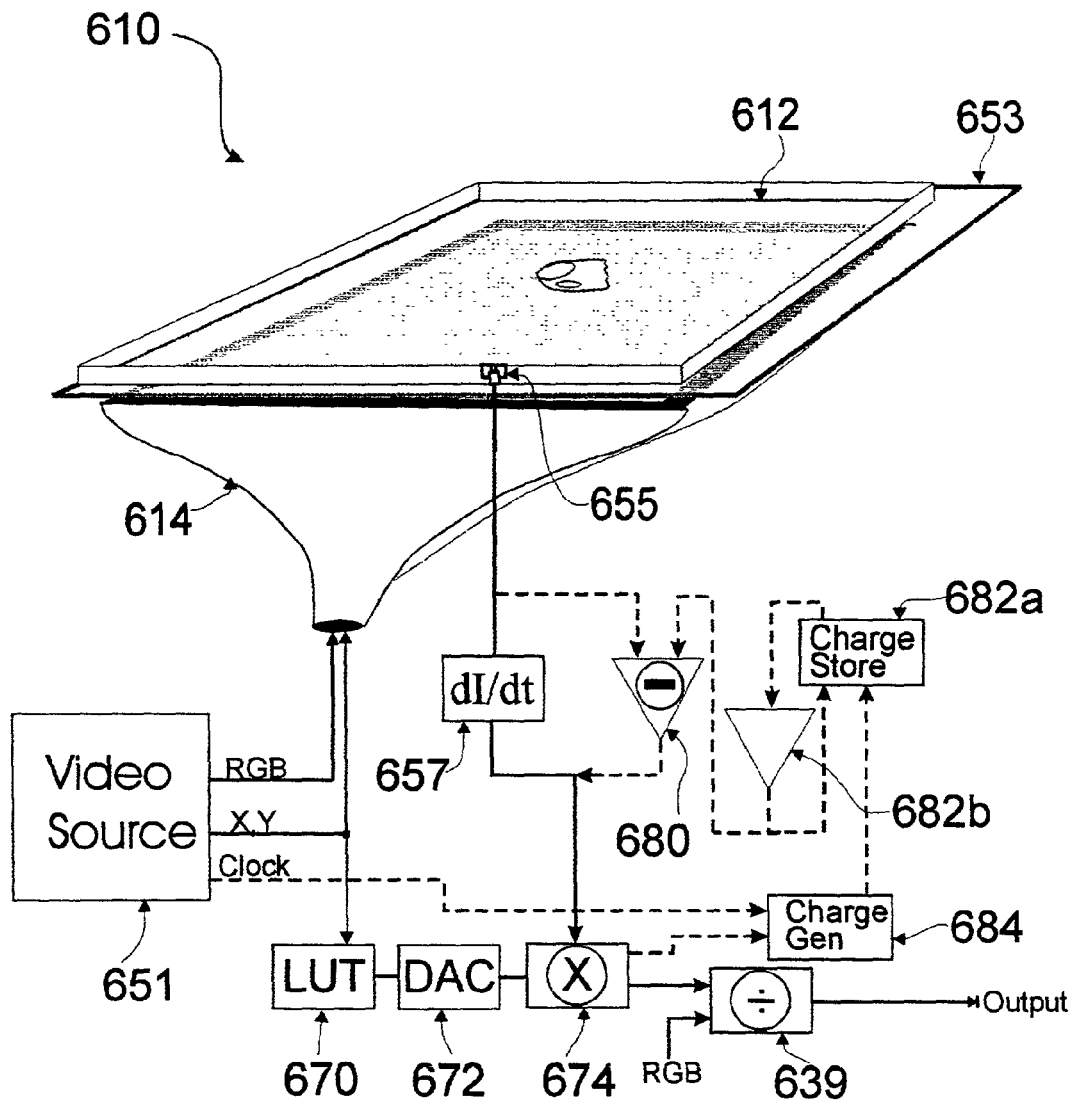
FIG. 17a is a schematic diagram, partially in perspective, of still yet another alternative embodiment of a human-machine interface in accordance with the present invention.

Referring now to FIG. 17a, still yet another embodiment of a human-machine interface in accordance with the present invention is shown and is generally indicated to by reference numeral 610. Similar to the previous embodiment, a commercially available CRT 614 using slow decay phosphors projects an image onto the panel 612. The CRT 614 receives RGB intensity signals and X and Y scanning signals from a video source 651 and sweeps the CRT spot across the panel 612 thereby to describe the image. The video source 651 also produces a clock signal synchronized with the pixel time.

Unlike the embodiment of FIG. 16, the lens 513 is omitted allowing the CRT 614 to be positioned in close proximity to the panel 612. As will be appreciated, the vertical separation between the CRT and the panel is exaggerated in FIG. 17a. A thin sheet of plastic 653 is inserted between the CRT 614 and the panel 612. One of the faces of the plastic sheet 653 has either a Fresnel lens, an array of small lenses or a holographic optical element thereon. The lens, lenses or holographic optical element are designed to focus the illumination from the CRT spot to a point on the panel 612.

The close proximity of the CRT 614 to the panel 612 precludes the use of a lens 537 to focus the light reflected by objects in contact with the contact surface of the panel 612 onto the RGB photodiodes. Therefore in order to collect light reflected by an object in contact with the contact surface 612a, RGB photodiodes 655 are positioned along a side edge of the panel 612. In this case, the RGB photodiodes 655 collect light reflected by an object in contact with the contact surface 612a that is internally reflected in the panel 612. In this embodiment, two methods are provided for processing the RGB photodiode signals. For ease of reference, the circuitry for only one color channel is shown.

In the first method, the RGB photodiode output signals are conveyed to differentiators 657, which separate the current pixel components of the RGB signals from the residual decay components. Under constant illumination from the CRT 614, the intensity of light striking the RGB photodiodes 655 may vary for different path lengths within panel 612. However, these variations can be cancelled by using LUTs to apply a multiplicative correction factor to the RGB signals for each X and Y position of the CRT spot image on the panel 612.

Prior to use, the human-machine interface 610 is calibrated by obtaining the array of multiplication factors for the panel 612. The multiplication factors may of course vary from panel to panel. Calibration is accomplished for the RGB channels by temporarily affixing a surface with a constant reflectivity, such as a piece of white plexiglass, to the contact surface 612a of the panel 612. A constant spot of white illumination is then applied to each (X,Y) point on the panel by the CRT spot. For each point, the DC RGB photodiode outputs are digitized and the multiplicative correction factors are determined and stored in RGB LUTs 670, which can be addressed at video data rates. The LUTs 670 are preferably stored in ROMs, so that no external data source is required.

The LUTs 670 are addressed by the X and Y scanning signals to output the correct red, green and blue multiplication factors for each pixel when the CRT spot is focused on the panel 612. Digital-to-Analog Converters (DACs) 672 convert the multiplication factors to analog form. Analog multipliers 674 apply the corrections to the analog RGB signals output by the differentiators 657. Signal dividers 639 divide the corrected RGB signals by the RGB intensity signals received from the video source 651 to determine the reflectivity of the RGB channels.

Signal processing using analog differentiators 657 has the disadvantage that the RGB photodiode signals are dependant upon the magnitude of the total optical decay signal of all T previous pixels, as shown in equation (6). However, equation (6) does not include a term for the different multiplicative correction factors required as a result of the different path lengths within the panel 612 for different decaying pixels. These errors can be only partially corrected by fine tuning the low-pass and high-pass characteristics of the differentiators 657.

In the second method for processing the RGB photodiode signals, $I_o$ can be calculated more accurately, using the alternative electronic pathway shown by dashed lines in FIG. 17a. In this embodiment, operational amplifiers 680 subtract from $I_o$ the total decay signal, including multiplicative correction factors computed by charge store circuits 682 as will be described below. The signals output by amplifiers 680 therefore, more precisely represent the RGB intensity values of the current pixel. These intensity signals are corrected by the analog multipliers 674 as previously described.

The corrected outputs of multipliers 674 control the operation of the charge store circuits 682, which consist of operational amplifiers 682b connected in feedback loops through electrical charge store networks 682a. The networks 682a may contain resistors, capacitors, inductors and other elements, and are configured to operate in conjunction with operational amplifiers 682b, as integrators whose decay curves match those of the RGB phosphors. The networks 682a each contain a charge storage capacitor (not shown), which provides the charge storage function of the integrators. It is presumed that when power is applied to the human-machine interface 610, the last T pixels on the CRT were black, and the initial charge in the storage capacitors is therefore, zero.

Charge generators 684 provide low impedance outputs that inject charges $q_R$, $q_G$, and $q_B$, into the charge storage capacitors. These charges are directly proportional to the output signal voltages generated by analog multipliers 674. The charge generators 684 are clocked by the pixel clock to inject these charges only during the interval of time before the end of the pixel time when the outputs of multipliers 674 have settled to stable values. Thus, the charge store circuits compute an instantaneous signal equal to the intensity of all previous decaying pixels. Each input charge is corrected by the multiplier 674 and hence, the total output signal is corrected for path length differences.

As described above, the signal dividers 639 divide the computed RGB signals by the RGB intensity signals from the video source 651 to determine the reflectivity of the RGB channels. The RGB reflectivity signals are then processed in the manner described previously.

Figure 17B:
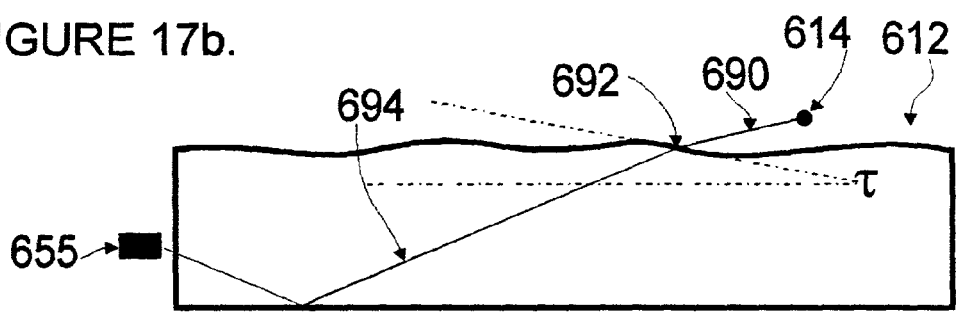

The RGB photodiodes 655 receive light solely through internal reflection within the panel 612. Due to the laws of internal reflection, none of the light rays reflected downward from portions of a finger not in contact with the top surface of the panel 612 are internally reflected. Instead they pass downward through the panel and are absorbed by the underlying CRT. Therefore the reflectivity signals output by dividers 639 do not include data for portions of a finger not in contact with the top surface of the panel 612. Without this data, the image analysis software 530 cannot determine the location of the tip of the finger and hence, cannot determine the shear forces applied to the panel 612 by the finger. This situation can be corrected by using a panel 612 with a very finely ground top surface, or a translucent textured surface coating as shown in FIG. 17b. As can be seen, the ground or coated surface of the panel 612 contains many local microscopic curved regions 692 where the surface forms an angle of T with respect to the horizontal. At these regions 692, rays 690 reflected from portions 614 of the finger, which are not in contact with the contact surface of panel 612, can enter the panel 612 at angles resulting in total internal reflection. The rays 690 like the ray 694, strike the RGB photodiodes 655. Ideally the surface characteristics are controlled so that the angle τ is small.

Turning now to FIGS. 18 to 21, yet another embodiment of a human-machine interface in accordance with the present invention is shown and is generally indicated to by reference numeral 710. As is shown, human-machine interface 710 includes a panel 712 and a holographic scanner 740 optically coupled to the panel 712. The holographic scanner 740 is magnified with respect to the panel 712 for ease of illustration. A finger 715 is in contact with the top surface 712a of the panel 712 at region 716. The scanner 740 directs light in a raster pattern across the surface 712a. The raster pattern includes a plurality of parallel lines in the X direction with differing Y coordinates. Scanner 740 is configured as an off-axis projector to create a more portable, flat human-machine interface, and to obviate the need for a CCD or CMOS camera. An example of a holographic scanner is described in U.S. Pat. No. 4,593,967.

The scanner 740 includes a monochromatic light source 741 emitting a beam of light in the near infrared region. The light beam passes through beam conditioning optics 741b to produce a thin, collimated, plane wave beam 743. The collimated beam 743 then passes through a holographic optical element (HOE) 741c, which corrects for beam variations caused by small wavelength fluctuations. The beam 743 then passes through a beam splitter 742, and impinges upon a circular rotating compound optical element 730 shown in an enlarged view in FIG. 19a and then on a fixed optical element. The rotating and fixed optical elements function to scan the beam 743 across the panel 712 in the raster pattern.

The compound optical element 730 contains three spaced, circular, multifaceted HOEs 731, 734 and 736. The HOEs are impressed, imprinted, or mounted upon disk substrates 732 and 735 made of suitable transparent material. An annular metallic separating ring 733 maintains a fixed distance between HOE 731 and HOE 734. It will be appreciated that the distances in the Y dimension between the HOEs is greatly exaggerated in FIG. 19a. Compound optical elements containing plural HOEs in separate layers of disk material are well known in the art. For example, U.S. Pat. No. 5,471,326 discloses a compound optical element to create a radial scan of a three dimensional region. The compound optical element 730 is mounted on a shaft 725 that is rotated by a motor 720.

The fixed optical element includes a pair of spaced HOEs 737 and 738 held in position by a bracket. HOE is positioned between the HOEs 731 and 734 while HOE 738 is positioned between HOE 736 and the panel 712.

Within the context of this application, the term holographic optical element (HOE) is used in a generic sense to designate one of three common types of optical elements, namely those fabricated by recording in a suitable medium interference fringes produced by optical means; those fabricated by recording in a suitable medium computed interference fringes using a computer controlled light source; and those fabricated by creating in a suitable medium three dimensional phase structures using lithographic or related techniques. The last HOE, commonly called a binary optical element (BOE), generally provides higher transmission efficiency.

Figure 19A:
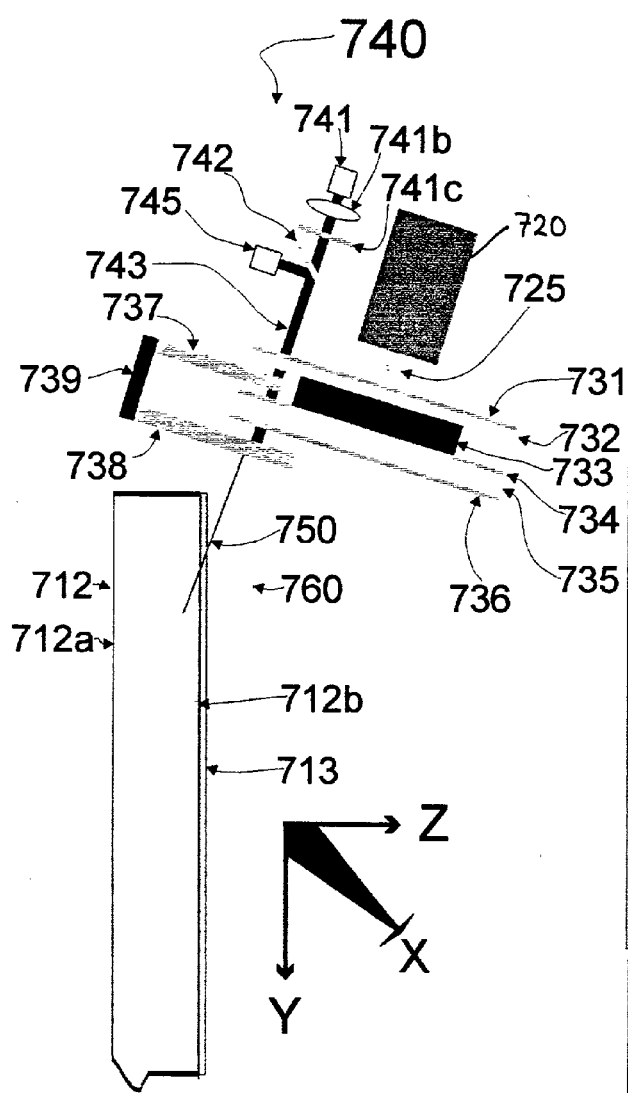
FIG. 19a is an enlarged side elevational view of a portion of the human machine interface of FIG. 18.
Figure 19B:
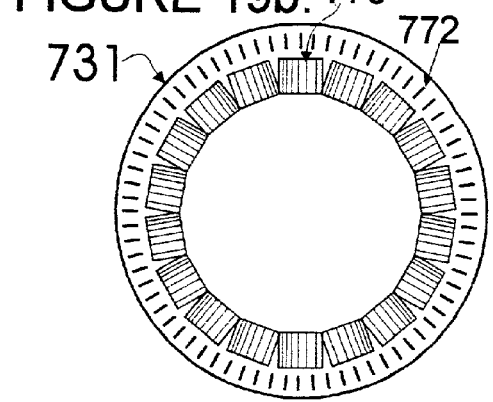
FIGS. 19b and 19c are top plan views of holographic optical elements forming part of the human-machine interface of FIG. 18.

FIG. 19b better illustrates HOE 731. As can be seen, HOE 731 includes a plurality of diffraction gratings 770 equal in number to the desired number of X direction scan lines in the raster pattern. The gratings 770 are arranged in an annular array near the outer edge of the circular substrate 732. As long as the size of each grating is small compared to the size of the substrate, the ruling lines of each grating will be substantially parallel to a radius of the substrate passing through the grating. The gratings 770 contain parallel ruling lines like the gratings described in U.S. Pat. No. 5,825,523 and illustrated in FIG. 20a. The distance between adjacent ruling lines is given by the grating function $G_1(x)$.

The HOE 737 is a single grating of the same type with a grating function $G_2(\xi)$ and is aligned radially with respect to gratings 770.

Figure 20A:
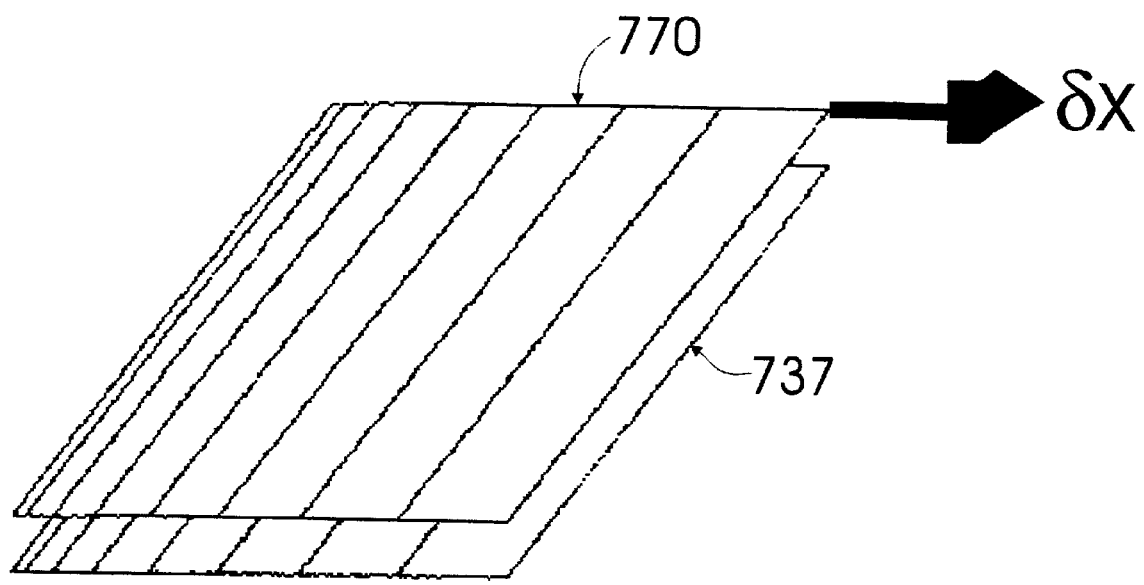
FIGS. 20a and 20b show optical paths through prior art diffraction gratings.
Figure 20B:
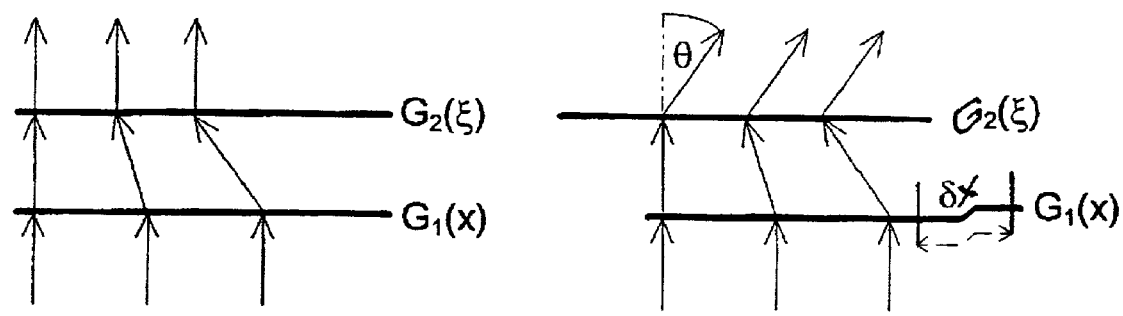

As taught in U.S. Pat. No. 5,825,523, when beam 743 passes through the gratings 770 and 737, and when the grating 770 is translated by δx in the linear direction indicated by the dark arrow in FIG. 20a, the HOE 737 deflects the beam 743 through an angle θ as shown in FIG. 20b. Large deflections on the order of 10-20 radians per millimeter of translation are possible with diffraction limited accuracy. Therefore, for a small diameter optical beam 743, the gratings 770 and the grating on HOE 737 can be made quite small while still producing useful angular deflections. The quantity dθ/dx is a constant, which depends upon the distance d between the HOEs, the wavelength of the beam, and the specific grating functions $G_1(x)$ and $G_2(\xi)$. In the HOEs 731 and 737, d, $G_1(x)$ and $G_2(\xi)$ are chosen according to the formulas taught in U.S. Pat. No. 5,825,523 so that during the rotation of the substrate 732 from one grating 770 to the next adjacent grating 770, the beam 743 will traverse the required distance across the panel 712 in the X direction. At the instant the next adjacent grating 770 engages the beam 743, the beam will snap back to its starting X position.

Figure 19C:
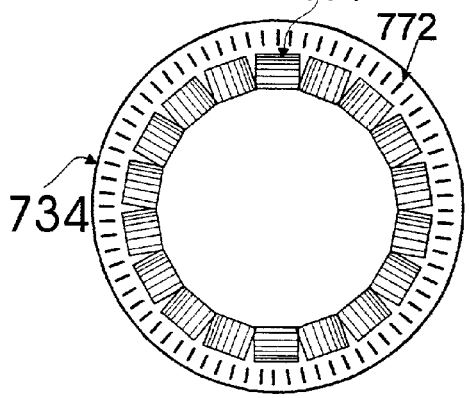

HOE 734 is better illustrated in FIG. 19c and similarly includes a plurality of diffraction gratings 771 impressed, imprinted, or mounted on the substrate 735. The number of gratings 771 is equal to the desired number of parallel scan lines in the X direction. The gratings 771 are aligned to coincide with the gratings 770. Gratings 771 are also of the type described in U.S. Pat. No. 5,825,523 and have a grating function $G_3(x)$. As shown in FIG. 19c, the gratings 771 are radially disposed near the outer edge of the circular substrate 735 with the angle of their ruling lines rotated 90 degrees with respect to the ruling lines of the gratings 770. As long as the size of each grating 771 is small compared to the size of the substrate 735, the ruling lines of each grating 771 will be substantially perpendicular to a radius of the substrate 735 passing through the grating.

The HOE 736 similarly is impressed, imprinted, or mounted on the opposite surface of substrate 735. HOE 736 has the same number of diffraction gratings as HOE 734 but with grating functions $G_4(\xi)$. The gratings on HOE 736 are aligned to coincide with the gratings on HOE 734. Thus, HOEs 734 and 736 provide a plurality of grating pairs as taught in U.S. Pat. No. 5,825,523.

If a grating 771 in HOE 734 could be translated in the Z direction by an amount dz with respect to its corresponding grating in HOE 736, the beam 743 passing through the gratings would be rotated through a corresponding angle $d\varphi$ in the YZ plane. The constant quantity $d\varphi/dz$ depends upon the thickness of the substrate 735, the wavelength of the light in beam 743, and the specific grating functions $G_3(x)$ and $G_4(\xi)$. However, in the present invention, such a translation is not possible because the grating pairs are permanently fixed to the substrate 735. Therefore, in the scanner 740 the grating line pattern for each grating 771 is fabricated to be slightly different from the previous grating 771. More specifically, from the perspective of the beam 743, each successive grating pattern 771 represents the pattern which would result from the linear translation of the previous grating 771 by the amount dz. In addition, the thickness of substrate 735 and grating functions $G_3(x)$ and $G_4(\xi)$ are chosen so that during one complete rotation of compound optical element 730, the beam 743 will, after passing through all the gratings 771 sequentially, exactly traverse a distance in the Y direction across the surface 712a from the nearest end of the scan line to the furthest end of the scan line.

In normal operation of the scanner 740, the motor 720 rotates at a constant angular velocity thereby to rotate compound optical element 730 so that the beam 743 traces a plurality of N scan lines across the panel 712 in the X direction, each at a slightly different location in the Y direction. For each of the N scan lines, the beam 743 first passes through a first pair of gratings constituted by the moving gratings 770 on disk 731 and the diffraction grating on fixed HOE 737. The motion of the gratings 770 with respect to the grating on HOE 737 causes the beam to scan through an angle $\theta$ in the X dimension. While scanning in this X direction, the beam 743 traverses the small separation between grating 737 and HOE 734. The beam then passes through the corresponding pair of aligned gratings on HOEs 734 and 736. The grating lines in this corresponding pair are substantially parallel to the X direction in which the beam is scanning. Therefore, the movement of HOEs 734 and 736 due to the rotation of the motor shaft 725 does not induce in the beam an additional scanning motion in the X direction. However a fixed deflection of the beam in the Y dimension occurs due to the above-mentioned differences in the grating line patterns for each successive grating 771.

One or more of the HOEs 731, 734, or 736 also includes a plurality of dark marks 772 impressed or imprinted on the substrates in a ring concentric to the ring of diffraction gratings 770. These marks are read by optoelectronics (not shown) to produce a clock signal indicating the speed of the motor 720. The speed of the motor is controlled by a closed-loop servo system (not shown) to produce a constant clock frequency.

Figure 18:
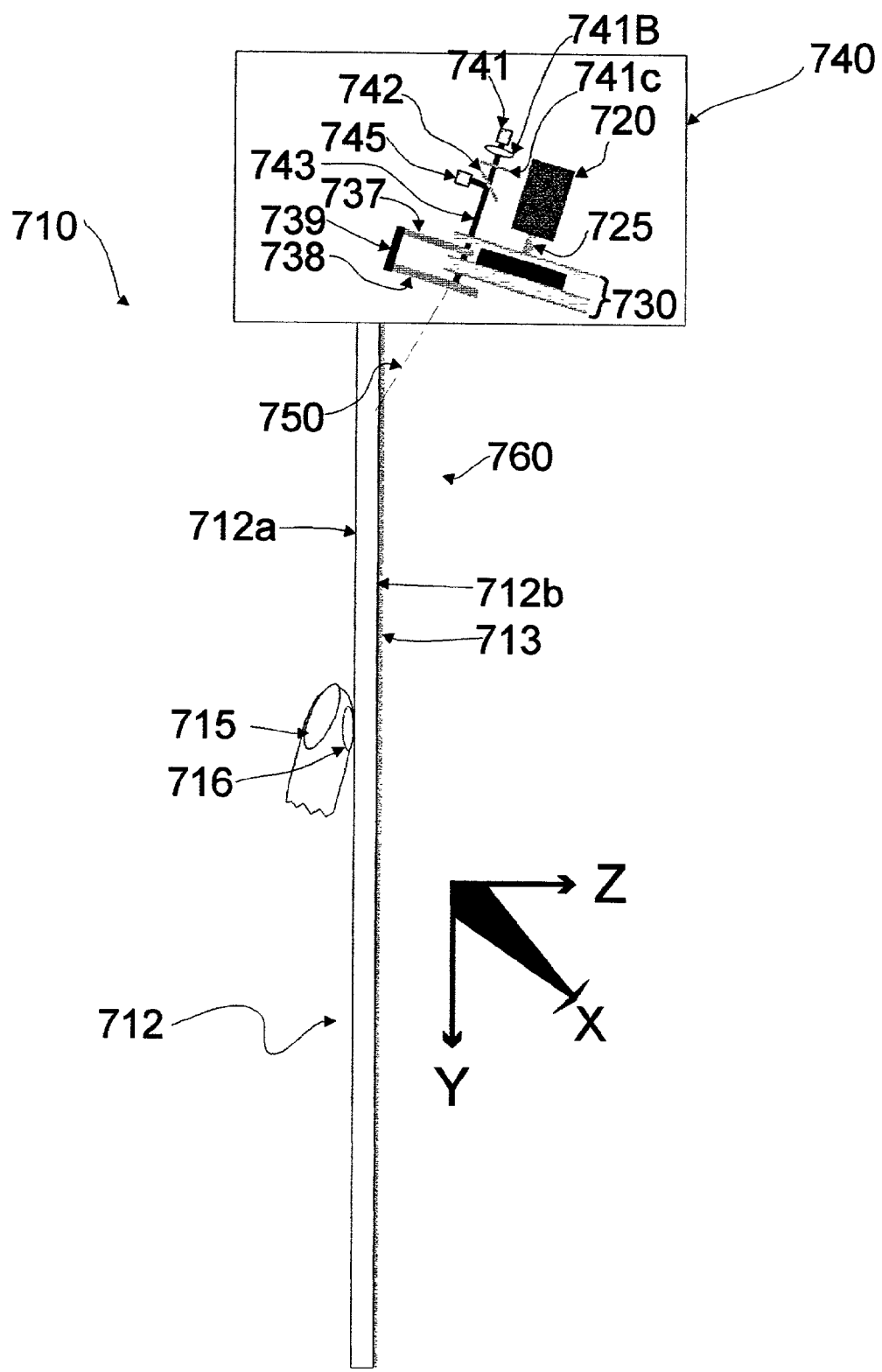
FIG. 18 is a schematic diagram in side elevation of still yet another alternative embodiment of a human-machine interface in accordance with the present invention.

As will be appreciated if the motor shaft 725 is rotated by motor 720 at a constant angular velocity the holographic scanner 740 will produce in beam 743 a straight-line scan in the X direction with a constant angular velocity but having a variable linear velocity. However, it is desirable for the scanning to occur at a constant linear velocity. Typically, an f-Theta optical lens is required to attain the required correction, which is termed an "f-Theta" correction. In the embodiment of FIG. 18, the beam 743 impinges directly upon the panel 712, instead of being focused through a lens. Therefore, it is more practical to use an alternative method for applying the f-Theta correction rather than using an f-Theta optical lens. In the present embodiment, the f-Theta correction is applied by changing the grating functions $G_1(x)$ in an identical manner for all gratings 770 to produce a new set of grating functions $G'_1(x)$. The new set of grating functions results in beam scans with a constant linear velocity but a variable angular velocity. Alternatively, the f-Theta correction can be incorporated into a separate HOE (not shown) positioned after the HOE 737.

Since the holographic scanner 740 scans the panel 712 with a beam that is off-axis a "keystone" effect is introduced. As a result, the amount of angular scan deflection required in the X direction will vary depending on the location of a given scan line in the Y direction. Therefore, the grating function $G'_1(x)$ for each grating 770 is further changed to produce a new grating function $G''_1(x)$ for each grating 770 that provides the proper X scan deflection for the given Y position. $G'_1(x)$ will be identical for all gratings 770, but $G''_1(x)$ will be different for each grating 770.

Alternatively, the required keystone correction function for the X scanning direction can be incorporated into a separate HOE (not shown) positioned after the HOE 738. In this separate HOE, the angular deflection of the beam 743 in the X direction is expanded as required, with a different degree of expansion for each position in the Z direction at which the beam 743 strikes the HOE (corresponding to different scan lines in the Y dimension).

An analogous correction for the Y scanning direction is applied to either $G_3(x)$ or $G_4(\xi)$ to ensure that scan lines are equidistant from each other in the Y dimension.

As will be appreciated, the off-axis nature of the holographic scanner 740, which is more pronounced in the Y dimension, will elongate the desired circular profile of the scanning beam 743 to an ellipse. The long axis of the ellipse will lie in the Y direction with a dimension $2r/\cos\varphi$, where r is the radius of the circular profile of the scanning beam, and $\varphi$ is the angle between the scanning beam 743 and a line normal to the contact surface 712a at the point of intersection. An additional fixed HOE 738 with an anamorphic optical transfer function is therefore provided to compress the beam in the Y dimension before it strikes the panel 712. The HOE 738 is fabricated so that the amount of beam compression depends upon the position in the Z dimension at which the beam 743 strikes the HOE 738. As a result, HOE 738 correctly compresses the beam for each possible deflection angle in the Y dimension. To simplify the design of HOE 738, it is desirable that the range of angles $\varphi$ between the nearest ray 750 and the furthest ray 760 is limited. The HOE 738 will therefore be required to produce anamorphic corrections in a limited range. Although there is also some elongation of the beam 743 in the X direction, this can be corrected by providing, in the transfer function of the HOE 738, an amount of beam compression in the X dimension, which depends upon the position in the X dimension at which the beam 743 strikes the HOE 738.

If the human-machine interface is large, a problem arises in that the optical beam 743 may begin to diverge, producing an undesirably large scanning spot. To deal with this problem, an additional optical transfer function can be added to HOE 738 to convert the profile of the beam 743 into a Bessel beam profile. Bessel beams exhibit a smaller spot size which is constant over a much longer optical path length. U.S. Pat. No. 5,336,875 discloses holographic optical methods for converting a beam to a Bessel beam. The Bessel function can alternatively be supplied by another HOE (not shown) placed after HOE 738.

After passing through the HOE 738, the beam may pass through an optional HOE 713, before entering the panel 712 via the bottom surface 712b of the panel 712. Once in the panel 712, the beams impinges upon the top surface 712a. When the beam 743 strikes a finger 715 either at a region 716 in contact with the surface 712a or at a region of finger 715 not in contact with the surface 712a, light is reflected back into the panel 712 in all directions. Some of the light returns through compound optical element 730 to the beam splitter 742. The returned light is then directed to a photodiode 745. The output of photodiode 745 is amplified to produce signals representing a sequence of pixel data suitable for processing by the image analysis software previously described. The above-mentioned dark marks 772 are read by optoelectronics (not shown) to produce clock signals specifying the location of the pixels on the surface 712a.

The photodiode 745 may be positioned in other locations to provide more advantageous operation. For example, the photodiode 745 and beam splitter 742 may be placed near HOE 738 and between HOE 738 and the surface 712b. Returning rays will then impinge upon the photodiode 745 without having to pass through the optics of the scanner 740. In this position, the photodiode 745 will receive a substantially greater portion of the reflected light, resulting in a higher signal-to-noise ratio.

Alternately, the photodiode 745 may be placed in close proximity to the edge of the panel 712, as described in the embodiment of FIG. 17. In this position, the beam splitter 742 is eliminated, thereby increasing the amount of light from light source 741 that strikes the surface 712a. However, in this position the photodiode output must be multiplied by the path length correction factors described with reference to the embodiment of FIG. 17 to place the photodiode output in a form suitable for processing by the image analysis software. It will be appreciated that the image analysis software in this embodiment will be unable to determine shear forces unless the top surface 712a is modified in the manner described with reference to the embodiment of FIG. 17.

The photodiode 745 may also be placed immediately beneath the bottom surface 712b facing upward. In this position, the beam splitter 742 can be omitted since the photodiode receives a larger portion of the rays reflected the finger. In this arrangement, the photodiode 745 also receives rays reflected from both contact and non-contact regions without having to alter the surface 712a of the panel 712 in the manner described with reference to the embodiment of FIG. 17. However, in this position the photodiode output depends on the angular relationship between an illuminated finger and the photodiode surface. The photodiode output can be corrected by multiplying it by a path angle correction factor to put it in a form suitable for processing by the image analysis software. This correction uses means identical to the path length correction method described with reference to the embodiment of FIG. 17.

Instead of a single photodiode 745, a first photodiode can be used in close proximity to the edge of the panel 712 together with a second photodiode positioned immediately beneath the bottom surface 712b of the panel and facing upwardly. This arrangement provides the advantages discussed above. This arrangement also provides a further advantage in that the signal provided by the first photodiode relates only to contact regions 716, while the signal derived by subtracting the signal of the first photodiode from the signal of the second photodiode relates only to non-contact regions of the finger. When the data in both signals is processed by the image analysis software, a more accurate computation of the shear forces applied to the panel 712 by a finger 715 is possible.

In the preferred embodiment, the scanner 740 is situated close to the surface 712b and at an angle off-axis as illustrated in FIG. 19a, thereby creating a flat device. It is however possible to incorporate a pair of folding mirrors (not shown) beneath the panel 712 to lengthen the optical path between the scanner 740 and the bottom surface 712b. The folding mirrors greatly diminish the depth of field between the nearest ray 750 and the furthest ray 760. As a result, the folding mirrors permit the incorporation of an additional lens (not shown) between the scanner 740 and the surface 712b to image the beam 743 to a point on the panel. In that case, the Bessel transfer function in HOE 738 may be eliminated.

It will be appreciated that if a flat device is not required, the scanner 740 can be located far away and on the optical axis passing through the center of the panel 712. In this case, the Bessel, keystone and anamorphic corrections previously described may all be eliminated, and an additional lens (not shown) between the scanner 740 and the surface 712b may be used to image the beam 743 to a point upon the panel 712.

The HOEs 731, 734, 736, 737, and 738 may be mass produced at a very low cost. Typically, the patterns of the diffraction gratings are determined mathematically and written directly to a master optical storage medium using computer controlled laser or electron beams. The masters may then be duplicated by means well known to those in the art. The HOEs 731, 734, 736, 737, and 738 may be binary diffractive optical elements, such as those described in U.S. Pat. Nos. 5,477,38 and 5,448,403. For binary diffractive elements, photo-micro-lithography, or similar methods for producing integrated circuits, is used to produce a master with a three-dimensional surface. The master is used as a mold to mass produce the HOEs.

Figure 19D:
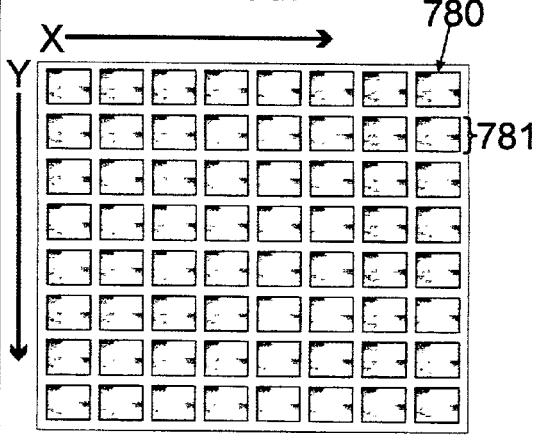
FIG. 19d is a top plan view of an array of panel diffraction gratings disposed on the touch sensitive panel of the human-machine interface of FIG. 18.

The accuracy of the scan may be improved by imprinting, impressing or attaching an additional HOE 713 on the bottom surface 712b of the panel 712. The HOE 713 includes an orthogonal matrix of diffraction gratings 780 as shown in FIG. 19d. Each diffraction grating 780 is designed to improve the characteristics of the image projected on the panel 712 by transforming the beam 743 as the beam enters the panel 712. That is, the beam can be further focused, reshaped, directed more accurately toward the desired point on the contact surface 712a.

For example, the anamorphic HOE 738 can be replaced with a simple cylindrical lens which compresses the profile of beam 743 into a small line extending in the X dimension when the beam strikes the HOE 713. The diffraction gratings 780 can then expand the beam in the Y dimension by the proper amount (which depends on the position of the diffraction grating 780) to form a square pixel on the surface 712a. Instead of an orthogonal matrix of diffraction gratings 780, the HOE 713 may include of a series of strip holograms, each of which extends across the surface 712b in the X direction, and which are stacked in the Y dimension to cover the entire surface. For certain transformations of the beam 743, strip holograms continuous in the X dimension may provide better results because the translation of the beam 743 across the surface 712b is continuous in the X dimension. In this case the HOE 713 may include a vertical stack of strip holograms. The HOE 713 may also include a single large hologram or diffraction grating attached to the bottom surface 712b of panel 712.

Figure 21A:
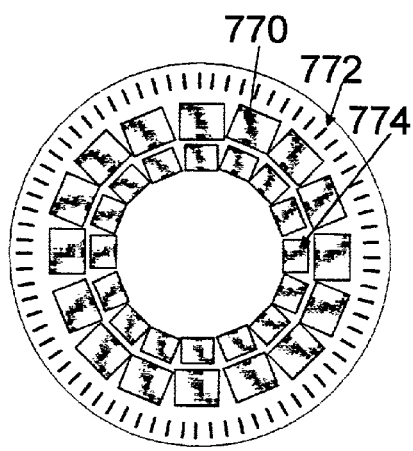
FIG. 21a is a top plan view of an alternative embodiment of a holographic optical element for the human-machine interface of FIG. 18.

The HOEs 731, 737, 734, 736 and 738 may also include a second analogous series of diffraction gratings 774 optimized for light in the visible region of the spectrum. In the case of HOEs 731, 734 and 736, the second diffraction gratings are arranged in a ring concentric to and inside of the ring of diffraction gratings 770. FIG. 21a illustrates the second ring of gratings 774. It should however be understood that this second ring is in fact a compound ring, including one grating corresponding to each grating in the rings of gratings contained in HOEs 731, 734 and 736. The second ring creates a similar raster scan, but using gratings designed for light in the visible region. The human-machine interface 710 in this case also includes a rapidly switchable second light source (not shown), which produces visible, collimated monochromatic illumination that impinges upon the gratings 774. When the shaft 725 rotates the compound optical element 730, this second ring produces a second raster scan of visible light upon the surface 712a. By modulating the visible light source with the video signal of an image, the image will appear on the contact surface 712a. This arrangement allows an image to be projected onto the surface 712a at a low additional cost. The image may include a map defining different functional areas on the panel 712. It will be appreciated that a full colour image can also be produced by using three rings coupled to red, green and blue monochromatic light sources rather than one ring coupled to a single second light source.

Figure 21B:
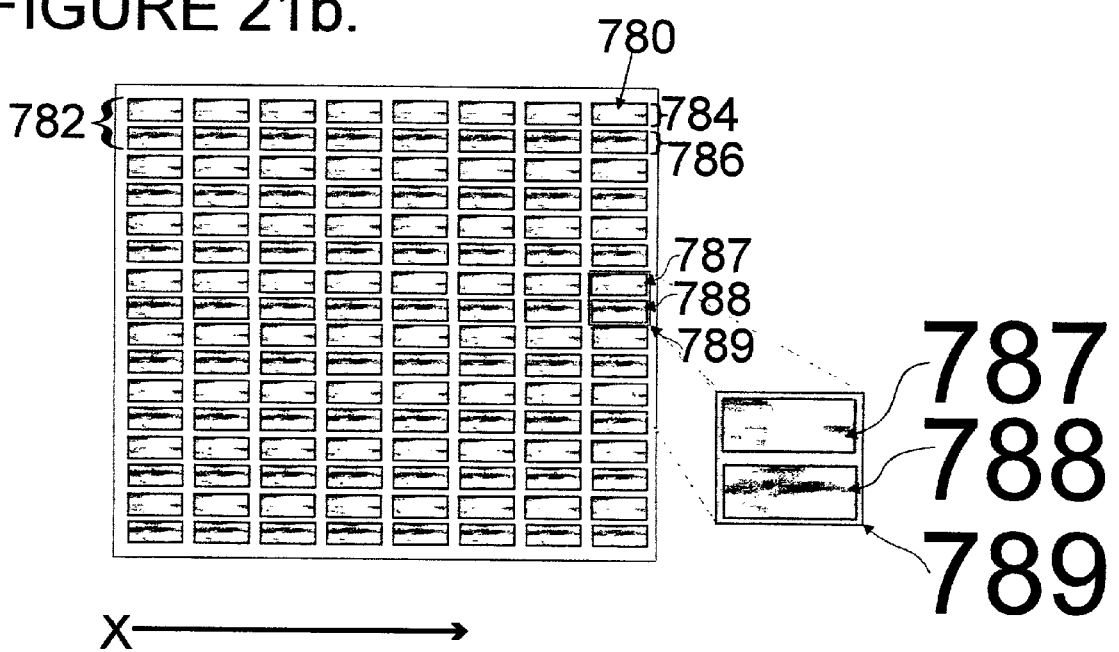
FIG. 21b is a top plan view of an alternative embodiment of an array of panel diffraction gratings for the human-machine interface of FIG. 18.

When a second concentric ring of compound diffraction gratings 774 is used, the optional HOE 713 includes an orthogonal matrix of diffraction gratings 780 as shown in FIG. 21b. Each row 782 of the matrix of diffraction gratings 780 includes upper and lower sub-rows of diffraction gratings 784 and 786. Each upper sub-row 784 of diffraction gratings is associated with one of the diffraction gratings 770. Each lower sub-row 786 of diffraction gratings is associated with one of the diffraction gratings 774. Each of the sub-rows 784 and 786 of diffraction gratings is optimized for the wavelength of one of the two light sources. For each wavelength of light, the appropriate concentric ring directs points of light to the appropriate row and sub-row of the matrix. It will be appreciated that in this case there are two diffraction gratings 787 and 788 for each pixel 789 of the surface 712a, and the diffraction gratings therefore must be compressed in at least one dimension, as shown in FIG. 21b. The optical function of each pair of diffraction gratings 787 and 788 is adjusted so that both gratings image into the same pixel 789 of the surface 712a. The optional HOE 713 may include a stack of strip holograms, in which case each strip includes an upper and lower sub-strip optimized for the wavelength of one of the two light sources and adjusted to image onto the entire pixel.

As will be appreciated, by providing three rings of diffraction gratings 774, the compound optical element 730 generates a full colour image as well as an infrared scanning beam that are directed onto the panel 712. If desired, the scanner 740 may be used as an on-axis or off-axis image projector either with or without contact sensing functions.

Figure 22A:
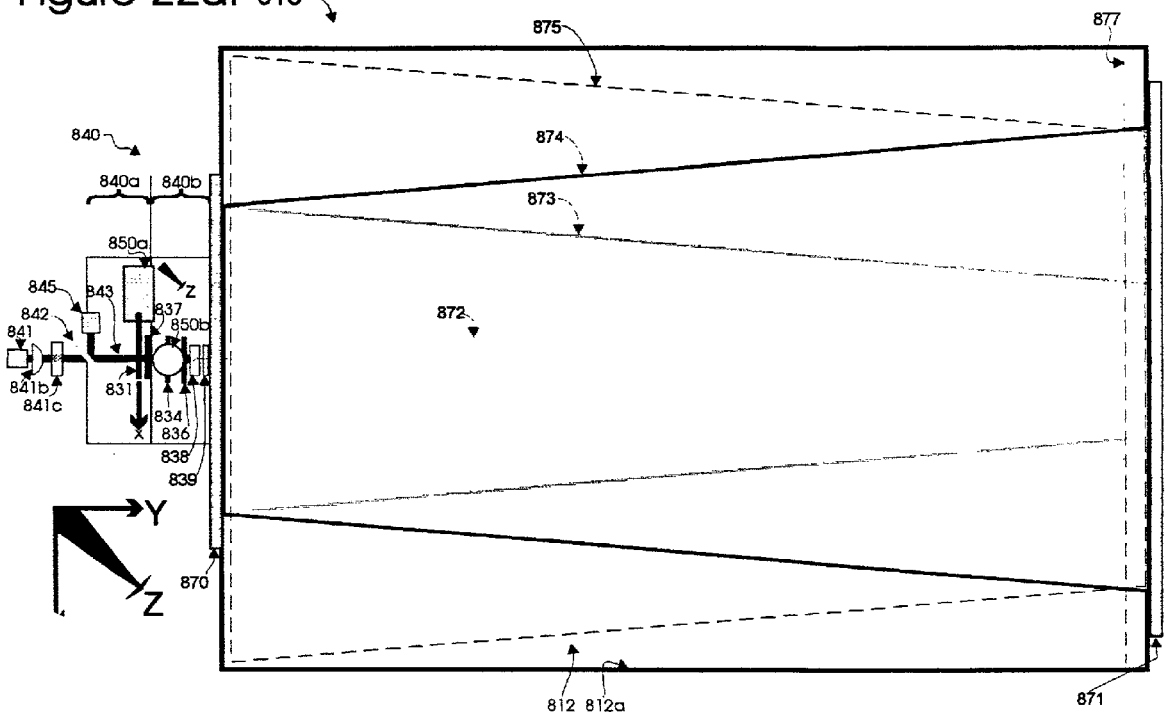
FIG. 22a is a top plan view of still yet another embodiment of a human-machine interface in accordance with the present invention.
Figure 22B:
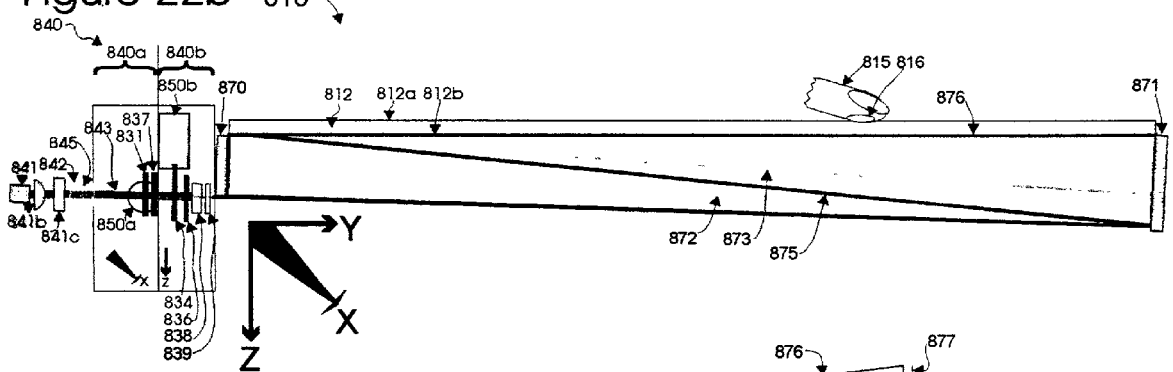

FIGS. 22a and 22b, show yet another embodiment of a human-machine interface 810 in accordance with the present invention. As can be seen, human-machine interface 810 includes a scanner 840 to scan the top surface 112a of a panel 812 with a spot of light that is swept across the panel surface in an XY raster pattern. In this embodiment, scanner 840 includes an X-dimension scanner 840a and a Y-dimension scanner 840a. A finger 815 is shown contacting the contact surface 812a of the panel 812 at a region 816. The scanner 840 includes a monochromatic light source 841 preferably emitting light in the near infrared region. The light passes through beam conditioning optics 841b to produce a thin, collimated, plane wave beam 843. The collimated beam then passes through an HOE 841c, which corrects for beam variations caused by small wavelength fluctuations. The beam 843 then passes through a beam splitter 842 before entering the X dimension scanner 840a. Scanner 840a includes two diffraction gratings 831 and 837 of the type described in U.S. Pat. No. 5,825,523 and previously with reference to the embodiment of FIG. 18. The gratings 831 and 837 possess grating functions $G_1(x)$ and $G_2(\xi)$, and are oriented so that their grating lines are vertical. Grating 831 is translated horizontally over grating 837 by linear actuator 850a in response to an electronic actuator drive circuit 851 (see FIG. 23). When an electrical signal drives the actuator, it produces a proportionate displacement dx of grating 831 in the horizontal direction. The displacement dx causes a horizontal deflection dθ of the beam 843.

The Y-dimension scanner 840b receives the beam 843 from scanner 840a and also includes two diffraction gratings 834 and 836. The distance between grating 837 and grating 834 is small, and is represented in an exaggerated fashion in FIGS. 22a and 22b. The gratings 834 and 836 possess grating functions $G_3(x)$ and $G_4(\xi)$, and are oriented so that their grating lines are horizontal. Grating 834 is translated vertically over grating 836 by linear actuator 850b in response to actuator drive circuit 851.

Within the context of this application the term "linear actuator" is used to describe any device able to cause a linear translation of the small diffraction gratings. The velocity and accuracy of the required linear translation depends upon the desired size, resolution and speed of the human-machine interface 810. Therefore the term "linear actuator" may refer to a piezoelectric, electrostrictive, magnetostrictive, voice coil, electromechanical, or any other type of linear actuator which meets the design requirements for a particular embodiment of the human-machine interface 810. Further, the linear actuator 850a used in the X dimension scanner 850b may be of a different type than the linear actuator 820b used in the Y dimension scanner 840b.

The beam 843 after exiting scanner 840b passes through HOE 838, which converts the profile of the beam 843 into a Bessel beam profile, as described above with reference to the embodiment of FIG. 18. The beam 843 then enters the HOE 839, which provides an anamorphic optical transfer function, as described above to compress the beam in the Y dimension. The HOE 839 is fabricated so that the amount of beam compression supplied depends upon the position in the Z dimension at which the beam 843 strikes the HOE 839, thereby providing the correct beam compression for each possible deflection angle in the Y dimension. To simplify the design of HOE 839, it is desirable that the range of scan angles (p in the YZ plane be limited. Although there is also some elongation of the beam 843 in the X dimension, this can be corrected by providing in the transfer function of the HOE 839 an amount of beam compression in the X dimension that is dependent upon the position in the X dimension at which the beam 843 strikes the HOE 839.

In this embodiment, the panel 812 includes folding mirrors 870 and 871. The scanner 840 is oriented at a slight positive angle in the YZ plane with respect to the angle of the folding mirror 871. The operation of folding mirrors 870 and 871 will now be described with reference to FIGS. 22a to 22d.

Figure 22C:
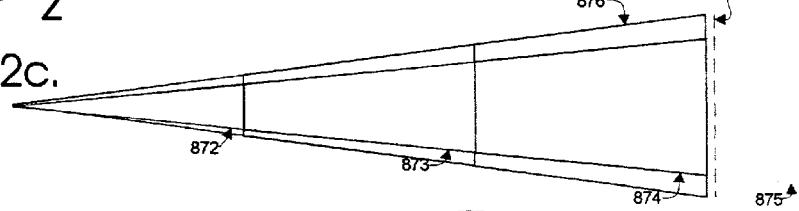
Figure 22D:
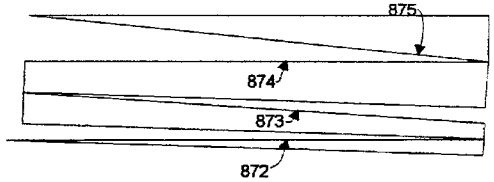
Figure 22E:
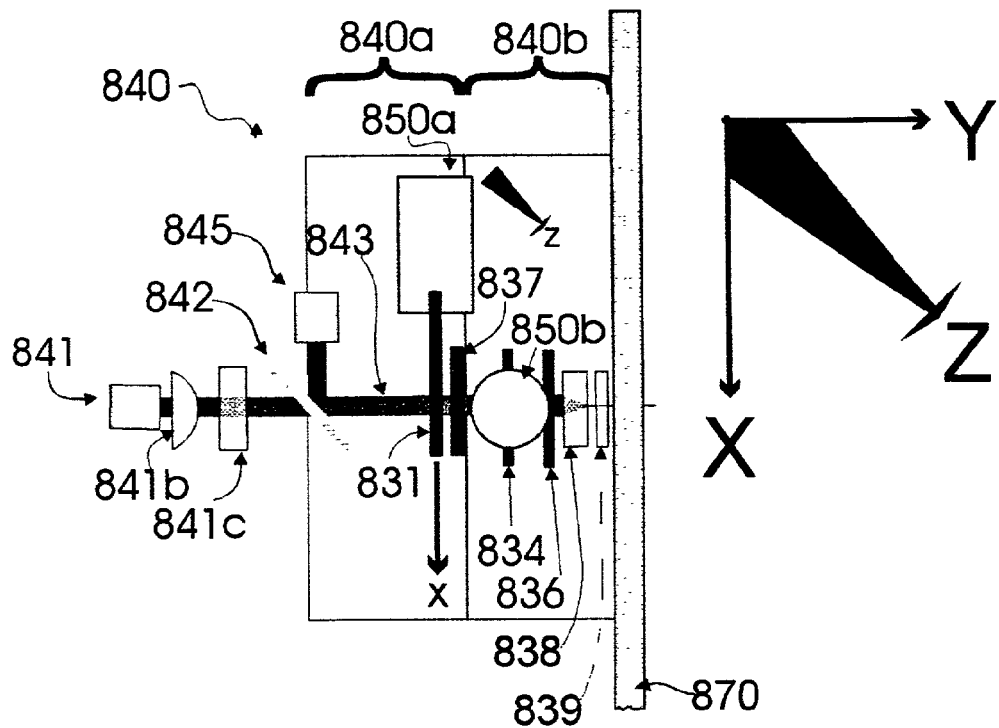
Figure 22F:
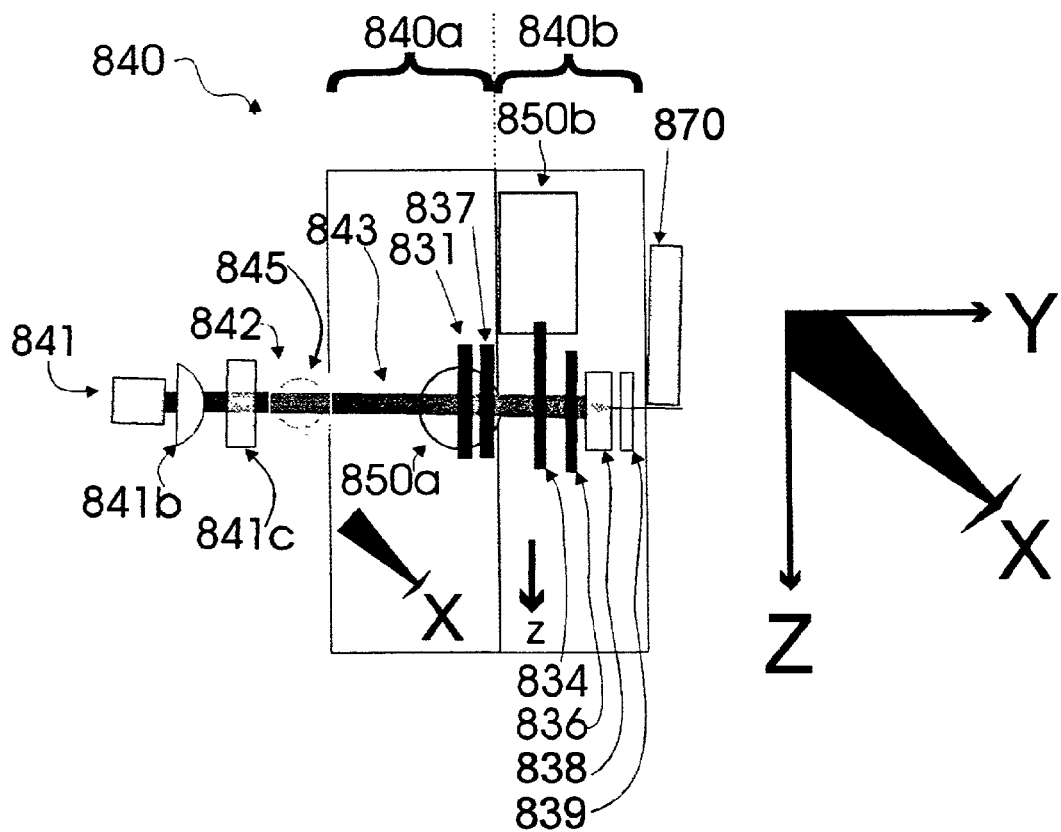

FIGS. 22a and 22b show the individual fold segments 872 to 875 of the beam 843 as overlying transparencies, while FIGS. 22c and 22d show the individual fold segments 872 to 875 of the beam 843 in unfolded, exploded renditions. It will be appreciated that the segments 872 to 875 in the drawings are used to represent the locus of the scanning beam 843 integrated over time as it moves through the space enclosed by folding mirrors 870 and 871. At any given instant the beam 843 is a very thin ray.

The first fold segment 872 of the scanned beam 843 occurs when the beam passes under folding mirror 870 and strikes folding mirror 871. The second fold segment 873 occurs when the beam is reflected from folding mirror 871 back towards folding mirror 870. The third fold segment 874 occurs when the beam is reflected from folding mirror 870 back towards folding mirror 871. For the side views of FIGS. 22b and 22d, the position and size of the fold segment 874 cause the beam to overlap with other fold segments and it is visible only in the exploded view of FIG. 22d. The fourth fold segment 875 occurs when the beam reflects from folding mirror 871, impinges on the bottom surface 812b of the panel 812, and then upon its top surface 812a. It will be appreciated that the angle of the folded beam in the XY plane of FIGS. 22a and 22c is the correct angle for a line whose Y dimension position is near the left edge of the surface 812a. For a line 877 near the right edge of the surface 812a, the apex of the triangle 876 in FIG. 22d represents the increased angle of the folded beam.

The folding mirrors 870 and 871 magnify the total length subtended by the angular deflections θ and φ introduced in the scanning beam 743 by the scanner 840. The folding mirrors therefore permit the scanning of a larger area of the surface 812a using a smaller angular deflection. Using a smaller angular deflection permits the employment of smaller diffraction gratings 831, 837, 834 and 836, as well as the employment of linear actuators 850a and 850b with smaller linear translations and faster translation times. In addition, because the folding mirrors 870 and 871 lengthen the optical path considerably, they decrease the depth of field between the nearest and furthest rays projected by the scanner 840. Therefore a lens (not shown) may be positioned between the scanner 840 and the folding mirror 870 to image the beam 843 to a point on the surface 812a. In this case, the HOEs 838 and 839 may be eliminated. Although the present embodiment folds the beam 843 into four segments, it will be appreciated that more or fewer segments may be advantageously created for different areas of surface 812a or different scanning speeds. For small devices, the use of folding mirrors may be eliminated entirely.

After passing through folding mirrors 870 and 871, the beam may pass through an optional HOE 813 (not shown) imprinted, impressed or attached to the bottom surface 812b of the panel 812. The functions and possible configurations of HOE 813 are identical to those of HOE 713 described above.

Figure 23:
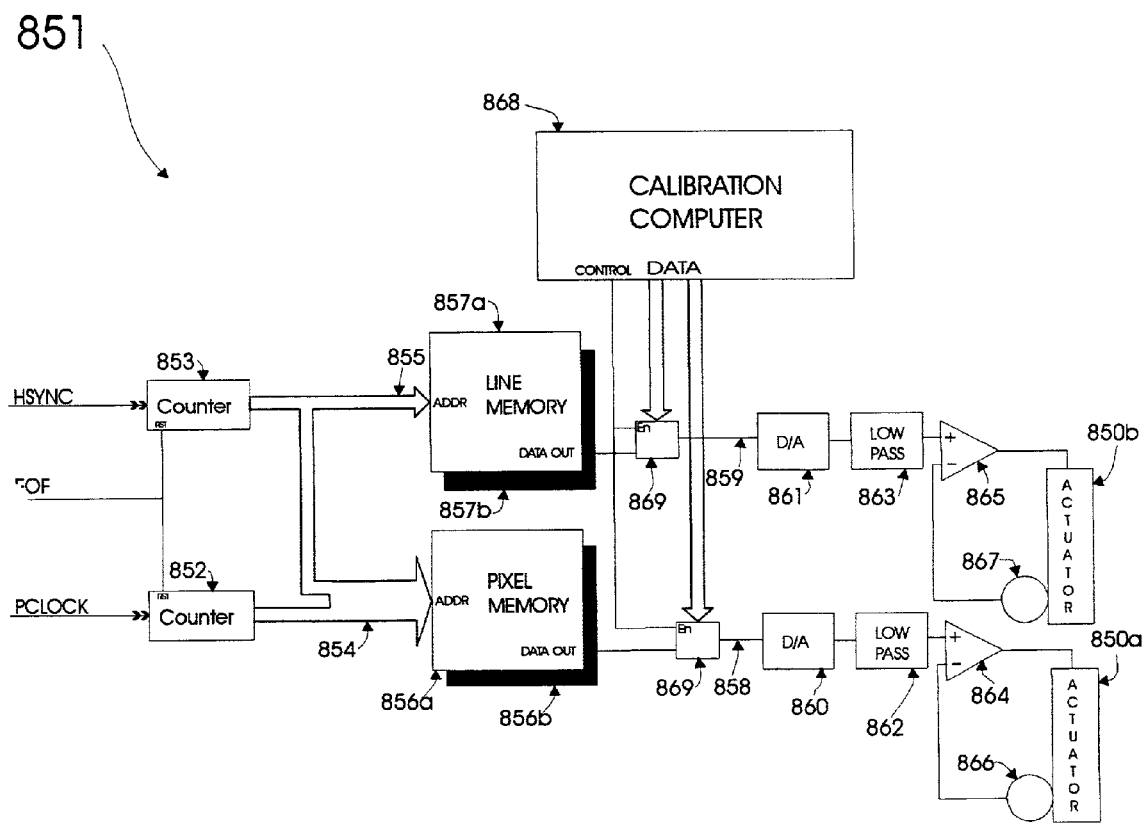

The actuator drive circuit 851 driving the X dimension scanner 840a and Y dimension scanner 840b is described in overview with reference to FIG. 23. Those skilled in the art will recognize that many different types of circuits may be constructed to drive the linear actuators 850a and 850b. The circuit 851 as will be described uses digital wave-table synthesis. This design has been selected because of its inherent simplicity, accuracy, and flexibility, as well as for its suitability to VLSI fabrication processes. The linear actuators 850a and 850b are controlled in a closed-loop configuration, connected with suitable positional feedback devices and servo amplifiers and using the output from the wave-table synthesizer as a reference signal.

As can be seen, circuit 851 takes as input a horizontal synchronization (HSYNC) signal, a pixel clock (PCLOCK) signal and an end-of-frame (EOF) signal. HYSYNC signal is a pulse generated at the beginning of each new scan line in the X dimension. PCLOCK signal is a pulse generated at the beginning of each pixel of a given scan line.

The PCLOCK and HSYNC signals clock binary digital counters 852 and 853 respectively to provide a digital address on a pixel address bus 854, which is unique for each pixel in the frame. The counter 853 also provides a digital address on a line address bus 855, which is unique for each scan line.

The address on the pixel address bus 854 causes pixel memory 856a to output a stored value on a pixel data bus 858. The output value is then applied to a fast digital-to-analog (D/A) converter 860 via multiplexer 869 and data bus 858. The D/A converter 860 then converts the digital value to an analog voltage, which, after filtering by low pass filter 862 to remove aliasing noise, becomes the reference signal for an X dimension electronic servo amplifier 864. In practice, the size of the pixel memory 856a will be N×M, where N is the desired number of pixels per line and M is the desired number of lines per frame. Each storage location of the pixel memory 856a contains a digital value B bits wide, where B is sufficiently large to provide the desired level of precision in the X dimension reference signal. Typically 9<B<12.

The address on the line address bus 855 causes the line memory 857a to output a stored value on a line data bus 859. The output value is then applied to a digital-to-analog (D/A) converter 861 via multiplexer 869 and data bus 859. The D/A converter 861 then converts the digital value to an analog voltage, which, after filtering by low pass filter 863 to remove aliasing noise, becomes the reference signal for a Y dimension electronic servo amplifier 865. In practice, the size of the pixel memory will be M lines per frame. Each storage location of the line memory 857a contains a digital value b bits wide, where b is sufficiently large to provide the desired level of precision in the Y dimension reference signal. Typically 9<b<12.

The actuators 850a and 850b are responsive to the respective outputs of amplifiers 864 and 865 and include position sensors 866 and 867 respectively. The position sensors may be resistive strain gages, linear variable differential transformers (LVDT), capacitive position sensors, optical interferometric sensors, or any other types of sensors that will provide the desired accuracy and speed. Different electronic components (not shown) may be required to process the output of the position sensors 866 and 867 before connecting them to the error inputs of servo amplifiers 864 and 865. The servo amplifiers 864 and 865 may be of any type which will provide the desired performance and supply the correct electrical drive signals to the actuators 850a and 850b, respectively.

In normal operation of the scanner 840, the counters 852 and 853 are driven by the HSYNC and PCLOCK signals and cause the pixel memory 856a and line memory 857a to output a raster sequence of M×N X and Y dimension beam position data values on the data busses 858 and 859. These data values are in turn converted to analog values before being conveyed to the amplifiers 864 and 865. The outputs of the amplifiers are applied to the linear actuators 850a and 850b. This results in relative movement of the gratings 834 and 836 in the scanners 840a and 840b. As a result, the beam 843 scans across the surface 812a in a raster pattern. At the end of each complete raster scan, the EOF signal provides a pulse which resets the values in the counters 852 and 853 through their RST inputs, and commences a new raster scan.

When the optical scanning beam 843 strikes a finger 815 at either a region of contact 816 with the surface 812a or at a region of the finger 815 not in contact with the surface 812a, light is reflected downward through the panel in all directions. Some of the light returns through the scanner 840 to the beam splitter 842. The returned light is then directed to a photodiode 845. The output of the photodiode 845 is amplified to produce signals representing a sequence of pixel data suitable for processing by the image analysis software previously described. The data on the pixel address bus 854 specifies the location of the pixel on the surface 812a.

The photodiode 845 may be positioned in other locations to provide more advantageous operation as described previously with reference to the embodiment of FIG. 18.

In the embodiment of FIG. 18, the application of f-Theta and keystone corrections were discussed. It will be appreciated, that these correction can also be applied to the human-machine interface 810 either optically or through modification of the data stored in the memories 856a and 857a.

In the preferred embodiment, the scanner 840 is situated close to the surface 812b and at an angle off-axis as illustrated in FIG. 22b, thereby creating a flat device. It will be appreciated that if a flat device is not required, the scanner 840 can be located far away and on the optical axis passing through the center of panel 812. In this case, the Bessel, keystone and anamorphic corrections previously described may all be eliminated, and an additional lens (not shown) between the scanner 840 and the surface 812b may be used to image the beam 843 to a point upon the surface 812a.

The multiplexers 869 permit extremely precise calibration of the scanner 840 during manufacturing through the use of a calibration computer 868. During calibration, the calibration computer 868 asserts its CONTROL signal causing the multiplexers 869 to transfer pixel and line data from the calibration computer 868 to the data busses 858 and 859 rather than from the memories 856a and 857a. As a result, the calibration computer controls the deflection of the beam 843. The calibration computer receives input from an electronic camera (not shown) that images a small portion of the surface 812a in magnified form. The camera's field of view can be scanned over the surface under the control of the computer by suitable means (not shown) to image any desired portion of the surface 812a.

During calibration, the software program in the calibration computer 868 positions the camera to capture an image of a certain portion of the surface 812a. Using an initial set of trial data values, the calibration computer 868 then produces a scan of the beam 843 over that portion of the surface by driving the pixel and line data busses 858 and 859 through multiplexers 869, preferably at the same rates at which they would normally be driven by counters 852 and 853. The calibration computer 868 simultaneously captures with the camera the image of the beam 843 scanning over that portion of the surface. The computer 868 then analyzes the image to determine the position of the beam 843 on the surface 812a for each pixel. If necessary, the computer 868 computes a new set of trial data values through appropriate algorithms to improve the accuracy and linearity of the scan, and performs another inspection of the same portion of the surface 812a. The process can be iterated a number of times for the same portion of the surface 812a to achieve any desired level of accuracy and linearity of the scan. The calibration computer then changes the camera's field of view to the next portion of the surface 812a.

For each calibrated pixel, the software stores the final trial data value and the associated pixel and line addresses in a memory table within the calibration computer 868. At the conclusion of the calibration procedure, the computer then writes the complete memory table into two EPROM memories that are then inserted into sockets 856b and 857b.

Using this method, the optical beam may be positioned with great precision on the surface 812a for each point in the XY raster scan. Hence the f-Theta and keystone corrections described above may be applied with sufficient precision to the scanners 840a and 840b through actuator drive circuit 851 rather than through optics. This approach provides an advantage in simplicity of design. It provides a further advantage in that a customized set of corrections can be determined for each manufactured unit, thereby further improving the precision of the scan. This approach provides yet a further advantage in that it allows the human-machine interface 810 to function at a variety of scanning resolutions and speeds by simply changing the values in the data tables in EPROMs 856a and 857a. It will be apparent that a group of data tables may be written in EPROMs 856a and 857a, and that the user may then adjust the operating characteristics of the human-machine interface by selecting the appropriate table from the group. It will also be apparent that for some types of actuators, the electronic method of calibration described above may permit the scanner 840 to operate in an open loop manner, thereby eliminating the position sensors 866 and 867, and their associated electronics (not shown).

During normal operation, the X dimension scanner 840a operates at a much higher speed than the Y dimension scanner 840b. If the human-machine interface 810 is to be operated at high scan rate in a particular application, the speed of the linear actuator 850a may become a limiting factor. It will be appreciated that the scanner 840a may in this case be replaced with either an electro-optical or an acousto-optical beam deflector, as are well known in the art.

It will be appreciated that, like the embodiment of FIG. 18, the embodiment of FIGS. 22a to 22f can serve as an image projector by incorporating additional visible light sources. FIG. 24 shows another embodiment of a human-machine interface including three visible monochromatic light sources 841, producing three beams of light in the red, green and blue regions of the spectrum. In this embodiment, the light beams pass through beam conditioning optics 841b to produce thin, collimated, plane wave beams 843. The collimated beams then pass through a compound HOE 841c, including separate sections for the three different wavelengths, to correct for beam variations caused by small wavelength fluctuations. The beams 843 then pass through a prism 841d, which reduces the separation between the beams 843. The beams 843 then pass through a beam splitter 842 and three lenses (unlabelled).

The beams then pass through gratings 831, 837, 834, 836, 838 and 839, all of which are compound gratings containing three elements. The elements perform identical functions to the gratings 831, 837, 834, 836, 838 and 839 in the embodiments of FIGS. 22a to 22f, but in each case, the elements are normalized for the wavelengths of the beams 843. The beams 843 then enter the space defined by the folding mirrors 870 and 871 and are directed, as has been previously described, toward the surface 812a. By adding appropriate lens functions to the three elements in compound HOE 839, by replacing HOE 839 with a lens, or by incorporating appropriate transfer functions in the HOE 813, the beams are made to converge upon a single point on the surface 812a, such as the representative point 879. Alternatively the three grating functions in compound gratings 834 and 836 can be modified to produce convergence of the beams 843 upon single points on the surface 812a.

In all other regards, the function of the human-machine interface of FIG. 24 is similar to that of the embodiment of FIGS. 22a to 22f.

Although the panels of the human-machine interfaces have been described as being formed of glass, performance in some instances may be enhanced by using other surfaces. The only restriction is that the surface must transmit energy to allow regions of contact to be sensed. In particular, certain optical coatings may be used to enhance the contrast of the image or to decrease the sensitivity to artifactual image components from scratches and grease on the contact surfaces. Thin flexible sheets of mylar or the like placed on the contact surfaces may also be used to enhance contrast and reduce sensitivity to artifactual images and dirt. Also, although the panels have been described as being planar, it will be appreciated that non-planar surfaces may provide ergonomic advantages in certain applications. In addition, it may also be advantageous to customize the panel for a particular individual by taking molds of the user's hands and producing complex concave surfaces on the panel that closely resemble the contours of the user's hands.

In the embodiments described above, the incident energy is shown to be visible or near infrared. It will be appreciated that near infrared illumination provides advantages due to its insensitivity to interference from visible light. Also, finger grease artifacts on the panel have a relatively low index of refraction in the infrared range and thus, do not produce bright images in the panel images. Other wavelengths such as ultraviolet, or even far infrared could be used.

Besides electromagnetic radiation, other types of energy and imaging may be used, for instance acoustical imaging. The choice of energy is of course limited to types which fingers or other objects of interest in contact with the panel, can affect and which can be scanned to generate a panel image.

In the embodiments described above, the incident energy is delivered to the contact regions in unmodified form. It will, however, be appreciated that the incident radiation may be varied spatially or temporally. For example, pulsed incident energy, such as stroboscopic light, may be used to enhance the detection of rapidly changing regions of contact or to improve immunity to ambient light.

Also, in the embodiments described above, the intensity of light resulting from contacts with the panel is detected. However, it will be appreciated that other energy characteristics or parameters such as polarization or phase may be measured. Also, multiple parameters of the energy may be measured. Likewise, although particular embodiments are described, other methods of detecting and/or processing the incident or changed energy in response to contacts with the panel can be employed.

Although preferred embodiments of the present invention have been described, those of skill in the art will appreciate that other variations and modifications may be made without departing from the spirit and scope thereof as defined by the appended claims.

I claim:

1. A human-machine interface comprising:
    a panel formed of energy transmissive material and having a substantially non-deformable major contact surface on which one or more object contacts is made and a second major surface generally parallel with said major contact surface;
    an energy source directing energy to said panel, said panel transmitting energy received from said energy source to said major contact surface, at least one parameter of energy transmitted by said panel being altered at regions where object contacts are made with said major contact surface;
    an image acquisition device acquiring, through said panel via said second major surface, an image generally over the area of the major contact surface including at least the alterations of the at least one parameter of the energy representative of said object; and
    a processor in communication with said image acquisition device, said processor processing said image to determine the location of each contact region on said major contact surface and at least one other attribute of each contact.

2. A human-machine interface as defined in claim 1 wherein said at least one other attribute includes the normal force applied to said panel at each of said contact regions.

3. A human-machine interface as defined in claim 2 wherein said at least one other attribute further includes oscillations in the normal forces applied to said panel during said contacts.

4. A human-machine interface as defined in claim 1 wherein said at least one other attribute includes shear forces applied to said panel at each of said contact regions.

5. A human-machine interface as defined in claim 1 wherein said locations are determined by calculating coordinates of said contact regions.

6. A human-machine interface as defined in claim 5 wherein said locations are determined by calculating the coordinates of the centers of said contact regions.

7. A human-machine interface as defined in claim 1 wherein said at least one other attribute further includes the instant contacts are made with said panel and the instant said contacts are ended.

8. A human-machine interface as defined in claim 7 wherein said at least one other attribute further includes the duration of each of said contacts.

9. A human-machine interface as defined in claim 1 wherein contacts are made on the major contact surface of said panel with a user's fingers, contact between the panel and said fingers altering the direction of energy transmitted by said panel, said contact regions being generally elliptical in shape.

10. A human-machine interface as defined in claim 9 wherein said processor calculates the normal forces applied to said panel at each of said contact regions by determining the areas of said elliptical contact regions.

11. A human-machine interface as defined in claim 1 further comprising a secondary light source illuminating a region over said panel thereby to illuminate objects or portions thereof proximal to but spaced from said major contact surface.

12. A human-machine interface as defined in claim 11 wherein said at least one other attribute includes one or more of:
    the normal forces applied to said panel at each of said contact regions;
    shear forces applied to said panel at each of said contact regions;
    the instant contacts are made with said panel and the instant said contacts are ended;
    the velocities at which the contacts are made with said panel and the velocities at which said contacts are ended;
    the durations of said contacts; and
    oscillations in the normal forces applied to said panel during said contacts.

13. A human-machine interface as defined in claim 12 wherein said processor determines the positions of the tips of fingers contacting said panel and calculates the shear forces by determining the coordinates of displaced finger tips with respect to the centers of said contact regions.

14. A human-machine interface as defined in claim 12 wherein said image acquisition device acquires images at selected intervals, each of said images including a plurality of pixels, each of said pixels attaining a pixel value proportional to its exposure to the at least one parameter of said energy during said interval, said processor generating histograms of said pixel values for pixels corresponding to contact regions in said images.

15. A human-machine interface as defined in claim 11 wherein said processor further calculates distances at which said objects or portions thereof are spaced above said major contact surface.

16. A human-machine interface as defined in claim 1 wherein energy directed to said panel is transmitted within said panel to said major contact surface as a result of total internal reflection.

17. A human-machine interface as defined in claim 16 wherein said energy source is a light source, said at least one parameter is the intensity of light, and light transmitted within said panel escapes from said panel at said contact regions to alter said energy.

18. A human-machine interface as defined in claim 17 wherein said image acquisition device acquires images of said panel at selected intervals, each image including a plurality of pixels that attain pixel values proportional to their exposure to light intensity, said pixel values being output by said image acquisition device.

19. A human-machine interface as defined in claim 18 wherein said light source radiates light, said image acquisition device is positioned adjacent said second major surface, and said light that escapes from said panel at said contact regions appears as intense regions.

20. A human-machine interface as defined in claim 19 further comprising a secondary light source illuminating a region over said panel to illuminate objects or portions thereof proximal to but spaced from said major contact surface.

21. A human-machine interface as defined in claim 20 wherein said at least one other attribute includes one or more of:
the normal forces applied to said panel at each of said contact regions;
shear forces applied to said panel at each of said contact regions;
the instant contacts are made with said panel and the instant said contacts are ended;
the velocities at which the contacts are made with said panel and the velocities at which said contacts are ended;
the durations of said contacts; and
oscillations in the normal forces applied to said panel during said contacts.

22. A human-machine interface as defined in claim 21 wherein the normal forces are determined by examining the areas of the intense regions in said images.

23. A human-machine interface as defined in claim 22 wherein said secondary light source produces a sheet of light over said major contact surface, said sheet of light illuminating tips of fingers whose pads contact said major contact surface sufficiently such that lunate highlights are included in images acquired by said image acquisition device, said processor using pixel values corresponding to the lunate highlights in said images to determine the central longitudinal axes of said fingers.

24. A human-machine interface as defined in claim 23 wherein shear forces are determined by comparing the positions of said intense regions with respect to the geometrical tips of the lunate highlights.

25. A human-machine interface as defined in claim 22 wherein said secondary light source illuminates said panel from the second major surface, said secondary light source illuminating fingers whose pads contact said major contact surface sufficiently such that outlines of said fingers are included in images acquired by said image acquisition device, said processor using pixel values corresponding to the outlines of said fingers in said images to determine the central regions of said fingers.

26. A human-machine interface as defined in claim 25 wherein said shear forces are determined by comparing the positions of said intense regions with respect to the geometrical tips of the finger outlines.

27. A human-machine interface as defined in claim 26 wherein said image acquisition device is optically coupled to said panel via a prism, and wherein each image includes a plurality of pixels that attain pixel values proportional to their exposure to the at least one parameter of said energy, said pixel values being output by said image acquisition device.

28. A human-machine interface as defined in claim 27 further including a light valve associated with said prism, said light valve being actuable to couple selectively said image acquisition device and panel.

29. A human-machine interface as defined in claim 28 wherein said image acquisition device is oriented at an acute angle to said panel.

30. A human-machine interface as defined in claim 28 wherein said light valve is a shutter actuable to select different angles of view for said image acquisition device.

31. A human-machine interface as defined in claim 22 wherein said processor further calculates distances at which said objects or portions thereof are spaced above said major contact surface.

32. A human-machine interface as defined in claim 20 wherein said processor further calculates distances at which said objects or portions thereof are spaced above said major contact surface.

33. A human-machine interface as defined in claim 1 wherein said energy source directs said energy towards said second major surface, said energy passing through said panel and escaping via said major contact surface, energy being reflected off of objects in contact with said major contact surface and propagating within said panel, said image acquisition device detecting energy propagating in said panel and acquiring images of said panel at selected intervals.

34. A human-machine interface as defined in claim 23 wherein said energy source directs light towards said second major surface at an acute angle.

35. A human-machine interface as defined in claim 34 wherein said second major surface and said major contact surface are precisely parallel and closely spaced to define a self-imaging waveguide.

36. A human-machine interface as defined in claim 35 further including a generally transparent sheet disposed on said major contact surface, said sheet having a roughened surface.

37. A human-machine interface as defined in claim 33 wherein contacts are made on said panel with a user's fingers, said contact regions being generally elliptical in shape.

38. A human-machine interface as defined in claim 37 wherein a region over said panel is illuminated to illuminate fingers or portions thereof proximal to but spaced from said major contact surface.

39. A human-machine interface as defined in claim 38 wherein said at least one other attribute includes one or more of:
   the normal forces applied to said panel at each of said contact regions;
   shear forces applied to said panel at each of said contact locations;
   the instant contacts are made with said panel and the instant said contacts are ended;
   the velocities at which the contacts are made with said panel and the velocities at which said contacts are ended;
   the durations of said contacts; and
   oscillations in the normal forces applied to said panel during said contacts.

40. A human-machine interface as defined in claim 39 wherein said normal forces are calculated by determining the areas of said elliptical contact locations.

41. A human-machine interface as defined in claim 1 further including means to project an image onto said panel, said image being visible on said major contact surface.

42. A human-machine interface as defined in claim 41 wherein said energy source is a cathode ray tube (CRT) positioned adjacent said second major surface, said CRT projecting said image on said panel by scanning said major contact surface with an energy beam, objects in contact with said major contact surface reflecting energy of said beam thereby to alter the same, said image acquisition device detecting reflected energy and outputting pixel values corresponding thereto.

43. A human-machine interface as defined in claim 42 wherein said image acquisition device includes red, blue, green (RBG) photodiodes to detect said reflected energy.

44. A human-machine interface as defined in claim 43 wherein said image acquisition device further includes signal dividers receiving red, green and blue intensity signals driving said CRT and the output of said photodiodes, said signal dividers calculating the reflectance of reflected energy thereby to generate said pixel values.

45. A human-machine interface as defined in claim 44 wherein said CRT is spaced from said panel, said human-machine interface further including at least one lens disposed between said CRT and said panel and at least one lens disposed between said RBG photodiodes and said panel.

46. A human-machine interface as defined in claim 43 wherein said CRT is proximal to said panel, said human-machine interface further including a sheet of transmissive material having at least one lens molded therein, disposed on said panel and positioned between said panel and said CRT.

47. A human-machine interface as defined in claim 46 wherein said major contact surface has a roughened surface.

48. A human-machine interface as defined in claim 1 wherein said energy source includes a scanner directing a beam of light into said panel and scanning said beam across said major contact surface in a raster pattern.

49. A human-machine interface as defined in claim 48 wherein said scanner includes a light source to generate said beam of light and a movable compound optical element disposed in the path of said beam, said compound optical element scanning said beam across said major contact surface in said raster pattern as said compound optical element moves.

50. A human-machine interface as defined in claim 49 wherein said compound optical element includes at least two spaced, rotatable holographic optical elements (HOEs), each HOE including at least one ring of circumferentially spaced diffraction gratings, each of said diffraction gratings scanning said beam across a respective row of said raster pattern when said beam impinges thereon and as said compound optical element is rotated.

51. A human-machine interface as defined in claim 50 wherein said scanner is off-axis and wherein said diffraction gratings have grating functions to compensate for keystoning.

52. A human-machine interface as defined in claim 50 wherein each HOE includes concentric rings of diffraction gratings, the diffraction gratings of one of said rings scanning said beam across said panel in said raster pattern, another of said rings projecting an image on said panel that is visible when looking at said major contact surface.

53. A human-machine interface as defined in claim 50 further comprising an array of rows of diffraction gratings disposed on a surface of said panel opposite said major contact surface, each row of diffraction gratings in said array being associated with a respective diffraction grating on said HOE and assisting to focus said beam on said major contact surface during scanning of said beam across said respective row.

54. A human-machine interface as defined in claim 1 wherein said energy source includes a pair of scanners directing a beam of light into said panel and scanning said beam across said major contact surface in a raster pattern.

55. A human-machine interface as defined in claim 54 wherein each of said scanners includes a pair of diffraction gratings movable relative to one another, wherein movement of the diffraction gratings of one of said scanners provides scanning of said beam across said panel in an X-direction and movement of the diffraction gratings of the other scanner provides movement of said beam in a Y-direction.

56. A human-machine interface as defined in claim 55 wherein said panel includes mirrors at opposite edges thereof, said mirrors reflecting the beam entering said panel back and forth a plurality of times prior to impingement of said beam on said major contact surface to lengthen the optical path of said beam within said panel.

57. A method of detecting contacts on a panel having a substantially non-deformable major contact surface and a second major surface generally parallel with said contact surface and being formed of energy transmissive material comprising steps of:
   directing energy to the panel, said panel transmitting energy to said major contact surface and at least one parameter of energy transmitted by the panel being altered at regions where contacts are made with the major contact surface;
   using an image acquisition device to acquire, through said panel via said second major surface, an image generally over the area of the major contact surface including at least the alterations of the at least one parameter of the energy representative of at least one object contact with said major contact surface; and
   processing said image to determine the location of each contact region on the major contact surface and at least one other attribute of each contact.

58. The method of claim 57 further comprising illuminating a region over said major contact surface.

59. The method of claim 58 wherein said image is processed to determine at least one of:
   the normal forces applied to the panel at each of the contact regions;
   shear forces applied to the panel at each of the contact regions;
   the instant contacts are made with the panel and the instant the contacts are ended;

the velocities at which the contacts are made with the panel and the velocities at which the contacts are ended;

the durations of the contacts; and oscillations in the normal forces applied to the panel during the contacts.

60. The method of claim 59 further comprising the step of projecting an image on the panel that is visible when looking at the major contact surface.

61. An interface for use with a panel formed of energy transmissive material and having a substantially non-deformable major contact surface on which one or more contacts is simultaneously made and a second major surface generally parallel with said major contact surface, the panel transmitting energy received from an energy source to the major contact surface wherein at least one parameter of the energy transmitted by the panel is altered at regions where contacts are made with the major contact surface, said interface comprising:

an image acquisition device acquiring, through said panel via said second major surface, an image generally over the area of the major contact surface including at least the alterations of the at least one parameter of the energy representative of said object; and a processor in communication with said image acquisition device, said processor processing said image to determine the location of each contact region on the major contact surface and at least one other attribute of each contact.

62. An interface as defined in claim 61 wherein said at least one other attribute includes the normal force applied to said panel at each of said contact regions.

63. An interface as defined in claim 62 further comprising a light source illuminating a region over said major contact surface and wherein said at least one other attribute further includes shear forces applied to said panel at each of said contact regions.

64. An interface as defined in claim 62 wherein said at least one other attribute further includes the instant contacts are made with said panel and the instant said contacts are ended.

65. An interface as defined in claim 64 wherein said at least one other attribute further includes the duration of each of said contacts.

66. An interface as defined in claim 62 wherein said at least one other attribute further includes oscillations in the normal forces applied to said panel during said contacts.

67. An interface as defined in claim 61 wherein said locations are determined by calculating coordinates of said contact regions.

68. An interface as defined in claim 67 wherein said locations are determined by calculating the coordinates of the centers of said contact regions.

69. A human-machine interface comprising:

a panel formed of energy transmissive material and having a substantially non-deformable major contact surface on which one or more object contacts is made and a second major surface generally parallel with said major contact surface;

an energy source directing energy into said panel, said energy propagating within said panel, energy escaping from said panel in response to each object contact with said major contact surface;

an image acquisition device acquiring, through said panel via said second major surface, an image generally over the area of the major contact surface including at least alterations of at least one parameter of said escaping energy representative of said object; and a processor in communication with said image acquisition device, said processor processing said image to determine the location of each contact region on said major contact surface and at least one other attribute of each contact.

70. A human-machine interface according to claim 69 wherein the energy source directs energy into a side of said panel.

71. A human-machine interface according to claim 69 wherein the energy escaping from said panel at each contact region illuminates the object in contact with said contact region.

72. A human-machine interface comprising:

a panel formed of energy transmissive material and having a substantially non-deformable major contact surface on which one or more object contacts is made and a second major surface generally parallel with said major contact surface;

an energy source directing energy to said panel, said panel transmitting energy received from said energy source to said major contact surface, at least one parameter of energy transmitted by said panel being altered at regions where object contacts are made with said major contact surface;

an image acquisition device having a field of view aimed at said second major surface, said image acquisition device acquiring, through said panel and from a region above said major contact surface, an image generally over the area of said major contact surface including at least the alterations of the at least one parameter of the transmitted energy representative of said object; and a processor in communication with said image acquisition device, said processor processing said image to determine the location of each contact region on said major contact surface and at least one other attribute of each contact.

* * * * *